US012679159B2

(12) United States Patent
Giovanardi et al.

(10) Patent No.: US 12,679,159 B2
(45) Date of Patent: Jul. 14, 2026

(54) SYSTEMS AND METHODS FOR VEHICLE CONTROL USING TERRAIN-BASED LOCALIZATION

(71) Applicant: ClearMotion, Inc., Billerica, MA (US)

(72) Inventors: Marco Giovanardi, Melrose, MA (US); Stefan Schulze, Brookline, MA (US); John Parker Eisenmann, Burlington, MA (US); William Graves, Somerville, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 18/270,275

(22) PCT Filed: Dec. 23, 2021

(86) PCT No.: PCT/US2021/065058
§ 371 (c)(1),
(2) Date: Jun. 29, 2023

(87) PCT Pub. No.: WO2022/146866
PCT Pub. Date: Jul. 7, 2022

(65) Prior Publication Data
US 2024/0317008 A1 Sep. 26, 2024

Related U.S. Application Data

(60) Provisional application No. 63/146,379, filed on Feb. 5, 2021, provisional application No. 63/132,184, filed on Dec. 30, 2020.

(51) Int. Cl.
*B60G 17/016* (2006.01)
*G01C 21/30* (2006.01)
*G07C 5/04* (2006.01)

(52) U.S. Cl.
CPC ........... *B60G 17/016* (2013.01); *G01C 21/30* (2013.01); *B60G 2400/204* (2013.01);
(Continued)

(58) Field of Classification Search
CPC .............. B60G 17/016; B60G 17/0165; B60G 2400/204; B60G 2400/821; B60G 2400/84; G01C 21/30; G07C 5/04
See application file for complete search history.

(56) References Cited

U.S. PATENT DOCUMENTS 5,432,700 A * 7/1995 Hrovat ............... B60G 17/0165
280/5.515
8,589,063 B2 11/2013 Trum
(Continued)

FOREIGN PATENT DOCUMENTS

DE 102008032545 A1 1/2010
DE 102014223475 A1 5/2016
(Continued)

OTHER PUBLICATIONS

U.S. Appl. No. 16/130,311, filed Sep. 13, 2018, Sridhar et al.
(Continued)

*Primary Examiner* — Toan C To
(74) *Attorney, Agent, or Firm* — Wolf, Greenfield & Sacks, P.C.

(57) ABSTRACT

Systems and methods described herein include implementation of road surface-based localization techniques for advanced vehicle features and control methods including confidence-based consumption, air suspension control systems and methods, end of travel management, road profile creation techniques, and others.

11 Claims, 11 Drawing Sheets

(52) U.S. Cl.
    CPC .... *B60G 2400/821* (2013.01); *B60G 2400/84*
            (2013.01); *G07C 5/04* (2013.01)

(56)                    References Cited

U.S. PATENT DOCUMENTS

| | | | |
|---|---|---|---|
| 9,102,209 | B2 * | 8/2015 | Giovanardi ........ B60G 17/0165 |
| 9,315,178 | B1 | 4/2016 | Ferguson et al. |
| 10,300,760 | B1 * | 5/2019 | Aikin .................... B60G 17/08 |
| 10,486,485 | B1 * | 11/2019 | Levinson ........... B60G 17/0162 |
| 10,737,544 | B2 * | 8/2020 | Panagis .............. B60G 17/0182 |
| 10,901,432 | B2 | 1/2021 | Sridhar et al. |
| 10,953,887 | B2 | 3/2021 | Magnusson et al. |
| 11,312,199 | B2 * | 4/2022 | Sohn .................. B60G 17/0165 |
| 2012/0203428 | A1 | 8/2012 | Choi et al. |
| 2014/0195112 | A1 | 7/2014 | Lu et al. |
| 2015/0352920 | A1 * | 12/2015 | Lakehal-Ayat .... B60G 17/0182 |
| | | | 701/38 |
| 2017/0236052 | A1 | 8/2017 | Israelsson et al. |
| 2018/0015801 | A1 | 1/2018 | Mohamed et al. |
| 2018/0079272 | A1 * | 3/2018 | Aikin .................... B60W 10/22 |
| 2019/0031199 | A1 | 1/2019 | Dudar |
| 2019/0079539 | A1 | 3/2019 | Sridhar et al. |
| 2019/0137275 | A1 | 5/2019 | Choudhury et al. |
| 2019/0147736 | A1 * | 5/2019 | Camp .................. G08G 1/0133 |
| | | | 340/905 |
| 2019/0359219 | A1 * | 11/2019 | Isshiki .................. B60W 40/06 |
| 2020/0117199 | A1 | 4/2020 | Akella et al. |
| 2020/0139784 | A1 | 5/2020 | Sridhar et al. |
| 2020/0139967 | A1 | 5/2020 | Beller et al. |
| 2020/0198431 | A1 * | 6/2020 | Isshiki ................. B60G 17/018 |
| 2020/0211394 | A1 | 7/2020 | King et al. |
| 2020/0317018 | A1 * | 10/2020 | Nong .................... G05D 1/027 |
| 2021/0055740 | A1 | 2/2021 | Sridhar et al. |
| 2021/0394573 | A1 | 12/2021 | Vente et al. |
| 2022/0082705 | A1 | 3/2022 | Graves et al. |
| 2022/0134831 | A1 * | 5/2022 | Akai .................... B60W 40/08 |
| | | | 701/37 |
| 2022/0189302 | A1 | 6/2022 | Jiang et al. |
| 2022/0196849 | A1 | 6/2022 | Chen et al. |
| 2022/0212678 | A1 | 7/2022 | Eisenmann et al. |
| 2022/0281456 | A1 | 9/2022 | Giovanardi et al. |
| 2022/0324421 | A1 | 10/2022 | Giovanardi et al. |
| 2022/0379679 | A1 | 12/2022 | Eisenmann et al. |
| 2022/0390239 | A1 | 12/2022 | Eisenmann et al. |
| 2023/0017774 | A1 | 1/2023 | Giovanardi et al. |
| 2025/0100559 | A1 * | 3/2025 | Jiang ..................... B60W 40/06 |
| 2025/0206095 | A1 * | 6/2025 | Yamada ............... B60G 17/015 |

FOREIGN PATENT DOCUMENTS

| | | | | |
|---|---|---|---|---|
| EP | | 2813728 A1 * | 12/2014 | .............. F16K 3/26 |
| EP | | 3 534 113 B1 | 11/2022 | |
| WO | WO 2012/019691 A1 | | 2/2012 | |
| WO | WO 2019/049080 A2 | | 3/2019 | |

OTHER PUBLICATIONS

U.S. Appl. No. 16/672,004, filed Nov. 1, 2019, Sridhar et al.
U.S. Appl. No. 17/009,243, filed Sep. 1, 2020, Sridhar et al.
U.S. Appl. No. 17/285,174, filed Apr. 14, 2021, Vente et al.
U.S. Appl. No. 17/436,012, filed Sep. 2, 2021, Jiang et al.
U.S. Appl. No. 17/477,147, filed Sep. 16, 2021, Graves et al.
U.S. Appl. No. 17/489,924, filed Sep. 30, 2021, Chen et al.
U.S. Appl. No. 17/511,331, filed Oct. 26, 2021, Eisenmann et al.
U.S. Appl. No. 17/560,794, filed Dec. 23, 2021, Giovanardi et al.
U.S. Appl. No. 17/560,825, filed Dec. 23, 2021, Giovanardi et al.
U.S. Appl. No. 17/772,036, filed Apr. 26, 2022, Eisenmann et al.
U.S. Appl. No. 17/773,676, filed May 2, 2022, Eisenmann et al.
U.S. Appl. No. 17/787,679, filed Jun. 21, 2022, Giovanardi et al.
U.S. Appl. No. 17/920,628, filed Oct. 21, 2022, Giovanardi et al.
U.S. Appl. No. 18/344,943, filed Jun. 30, 2023, Sridhar et al.
U.S. Appl. No. 18/343,130, filed Jun. 28, 2023, Vente et al.
U.S. Appl. No. 18/267,912, filed Jun. 16, 2023, Karavas et al.
PCT/US2021/065058, May 5, 2022, International Search Report and Written Opinion.
International Search Report and Written Opinion mailed May 5, 2022 in connection with International Application No. PCT/US2021/065058.

* cited by examiner

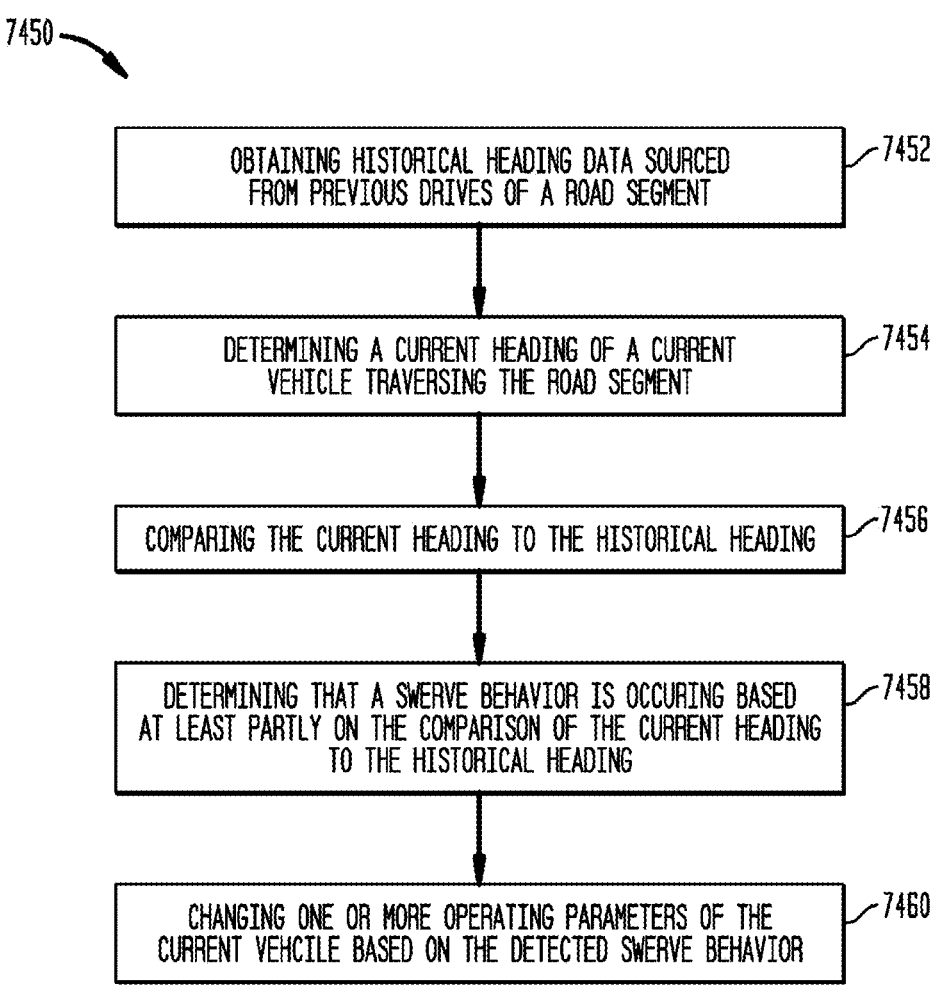

OBTAINING HISTORICAL HEADING DATA SOURCED
FROM PREVIOUS DRIVES OF A ROAD SEGMENT    7452

DETERMINING A CURRENT HEADING OF A CURRENT
VEHICLE TRAVERSING THE ROAD SEGMENT    7454

COMPARING THE CURRENT HEADING TO THE HISTORICAL HEADING    7456

DETERMINING THAT A SWERVE BEHAVIOR IS OCCURING BASED
AT LEAST PARTLY ON THE COMPARISON OF THE CURRENT HEADING
TO THE HISTORICAL HEADING    7458

CHANGING ONE OR MORE OPERATING PARAMETERS OF THE
CURRENT VEHCILE BASED ON THE DETECTED SWERVE BEHAVIOR    7460

FIG. 7

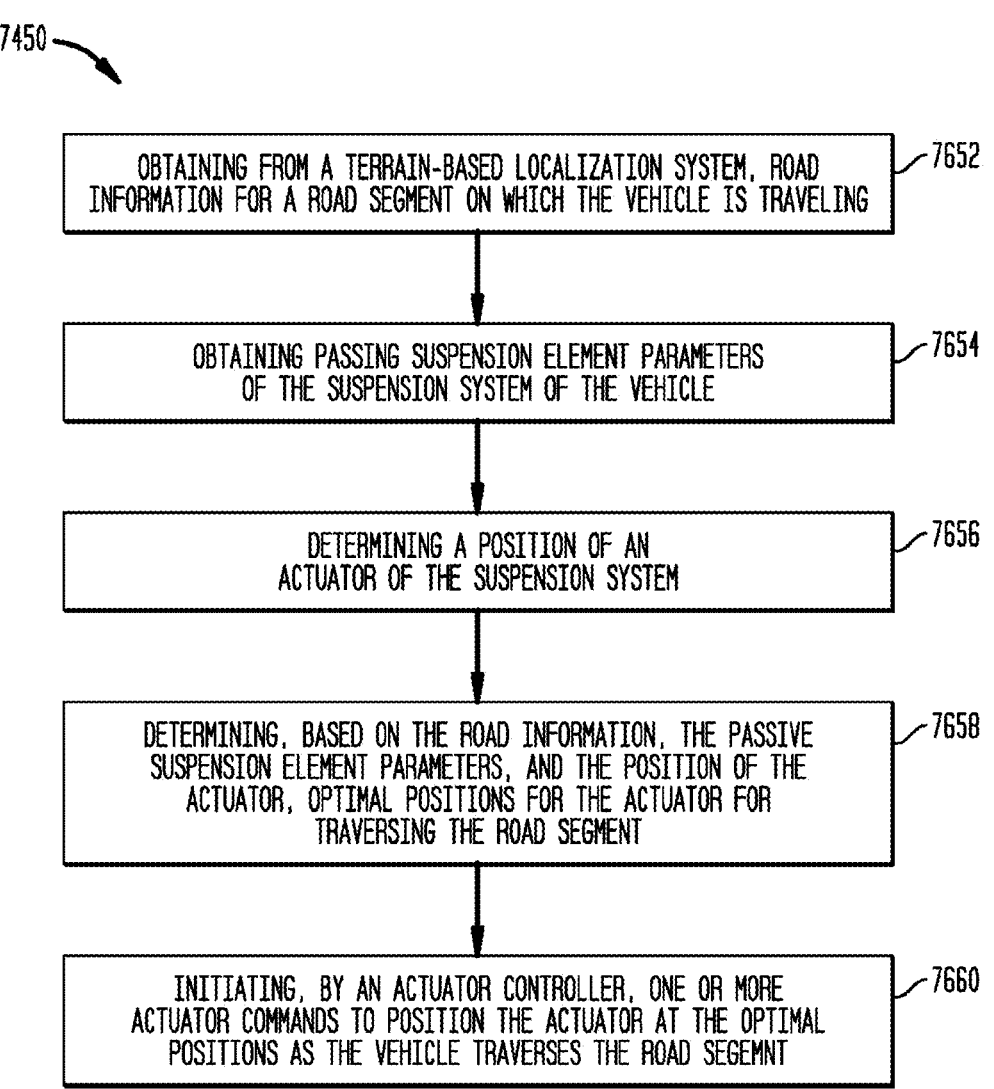

7450

OBTAINING FROM A TERRAIN-BASED LOCALIZATION SYSTEM, ROAD INFORMATION FOR A ROAD SEGMENT ON WHICH THE VEHICLE IS TRAVELING ⟋7652

OBTAINING PASSING SUSPENSION ELEMENT PARAMETERS OF THE SUSPENSION SYSTEM OF THE VEHICLE ⟋7654

DETERMINING A POSITION OF AN ACTUATOR OF THE SUSPENSION SYSTEM ⟋7656

DETERMINING, BASED ON THE ROAD INFORMATION, THE PASSIVE SUSPENSION ELEMENT PARAMETERS, AND THE POSITION OF THE ACTUATOR, OPTIMAL POSITIONS FOR THE ACTUATOR FOR TRAVERSING THE ROAD SEGMENT ⟋7658

INITIATING, BY AN ACTUATOR CONTROLLER, ONE OR MORE ACTUATOR COMMANDS TO POSITION THE ACTUATOR AT THE OPTIMAL POSITIONS AS THE VEHICLE TRAVERSES THE ROAD SEGEMNT ⟋7660

FIG. 8

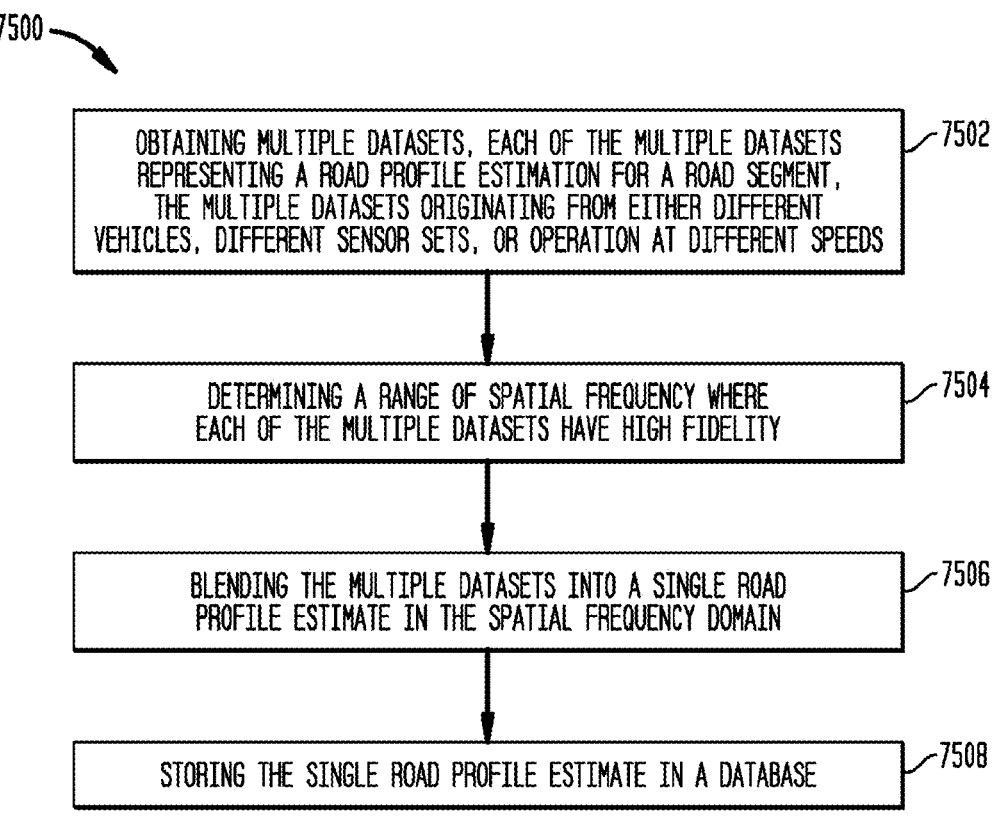

7500

OBTAINING MULTIPLE DATASETS, EACH OF THE MULTIPLE DATASETS REPRESENTING A ROAD PROFILE ESTIMATION FOR A ROAD SEGMENT, THE MULTIPLE DATASETS ORIGINATING FROM EITHER DIFFERENT VEHICLES, DIFFERENT SENSOR SETS, OR OPERATION AT DIFFERENT SPEEDS ⎯7502

DETERMINING A RANGE OF SPATIAL FREQUENCY WHERE EACH OF THE MULTIPLE DATASETS HAVE HIGH FIDELITY ⎯7504

BLENDING THE MULTIPLE DATASETS INTO A SINGLE ROAD PROFILE ESTIMATE IN THE SPATIAL FREQUENCY DOMAIN ⎯7506

STORING THE SINGLE ROAD PROFILE ESTIMATE IN A DATABASE ⎯7508

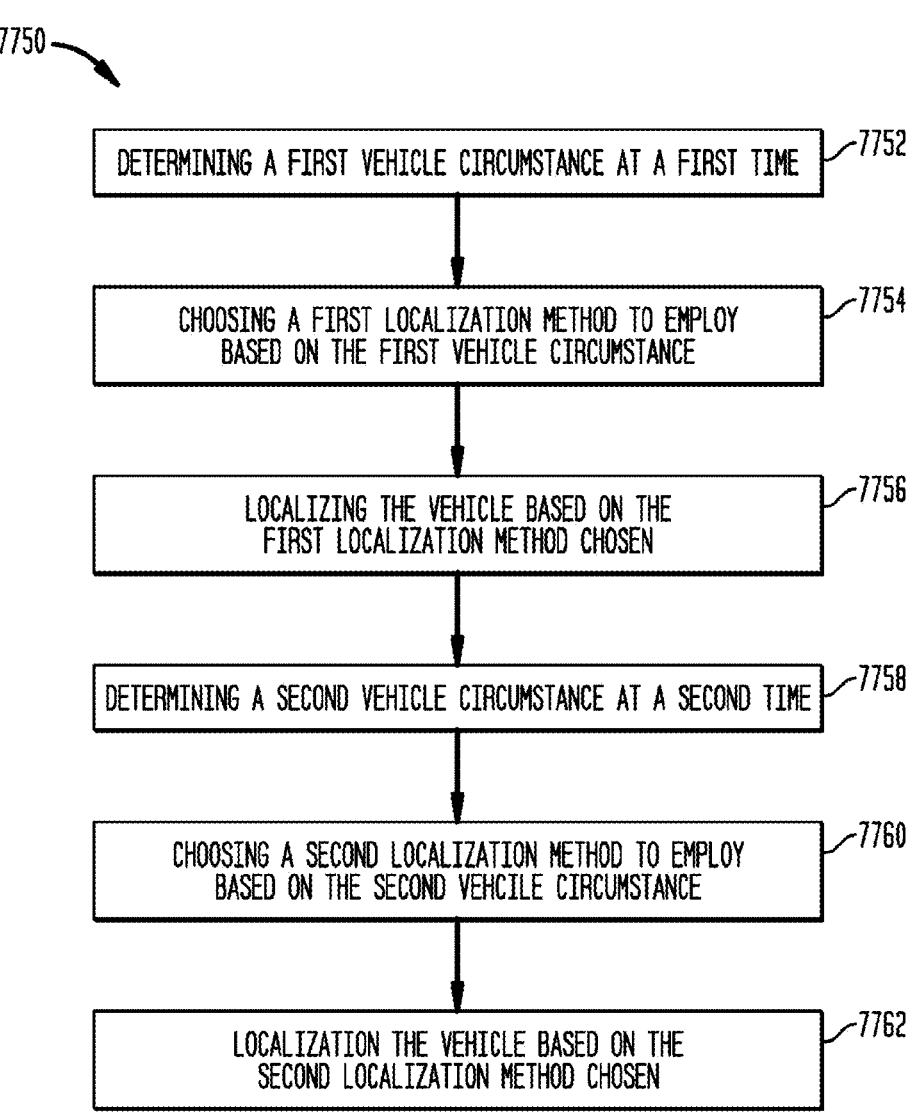

7750

DETERMINING A FIRST VEHICLE CIRCUMSTANCE AT A FIRST TIME — 7752

CHOOSING A FIRST LOCALIZATION METHOD TO EMPLOY
BASED ON THE FIRST VEHICLE CIRCUMSTANCE — 7754

LOCALIZING THE VEHICLE BASED ON THE
FIRST LOCALIZATION METHOD CHOSEN — 7756

DETERMINING A SECOND VEHICLE CIRCUMSTANCE AT A SECOND TIME — 7758

CHOOSING A SECOND LOCALIZATION METHOD TO EMPLOY
BASED ON THE SECOND VEHCILE CIRCUMSTANCE — 7760

LOCALIZATION THE VEHICLE BASED ON THE
SECOND LOCALIZATION METHOD CHOSEN — 7762

SYSTEMS AND METHODS FOR VEHICLE CONTROL USING TERRAIN-BASED LOCALIZATION

RELATED APPLICATIONS

This application is a national stage filing under 35 U.S.C. § 371 of International Patent Application Serial No. PCT/US2021/065058, filed Dec. 23, 2021, which claims the benefit of priority under 35 U.S.C. § 119 (e) of U.S. Provisional Application Ser. No. 63/132,184, filed Dec. 30, 2020, and U.S. Provisional Application Ser. No. 63/146,379, filed Feb. 5, 2021, the disclosures of which are incorporated herein by reference in their entirety.

TECHNICAL FIELD

Disclosed embodiments are related to systems for terrain-based localization and insights for systems in vehicles and related methods of use.

BACKGROUND

Advanced vehicle features such as, for example, advanced driver assistance systems, active suspension systems, and/or autonomous or semi-autonomous driving may rely on highly accurate localization of a vehicle. Localization systems based on, for example, global navigation satellite systems (GNSS), may not provide sufficient accuracy or resolution for such features.

SUMMARY

According to one aspect, the disclosure provides a method of operating a vehicle. The method includes determining a location of a vehicle and determining a value of a quality metric for the location of the vehicle. The method includes comparing the quality metric to an upper bound and a lower bound for the quality metric. The method includes initiating a command to a vehicle subsystem based on the comparison.

In some implementations, the method includes determining that the value of the quality metric is above the upper bound. In some instances, the command initiated to a vehicle subsystem is a full intended command.

In some implementations, the method includes determining that the value of the quality metric is between the upper bound and the lower bound. In some instances, the command initiated to the vehicle subsystem is a scaled command.

In some implementations, the vehicle subsystem is a variable damper system, an active suspension system, an active roll stabilizer system, or a rear steering system.

According to another aspect, a method of controlling an air suspension system of a vehicle is disclosed. The method includes determining a location of the vehicle on a current road segment using a terrain-based localization system. The method also includes obtaining road information including at least one of road characteristics, road events, or a road profile of an upcoming road segment. The method also includes calculating, based on the road information, an optimal state of the air suspension for traveling along the upcoming road segment, wherein the optimal state of the air suspension includes at least one of an optimal ride height or an optimal stiffness setting. The method also includes initiating a command to set the air suspension system at the optimal state for traversal of the upcoming road event.

In some implementations, the optimal ride height comprises a height profile for the air suspension.

In some implementations, the optimal stiffness setting comprises a stiffness profile for the air suspension system.

In some implementations, determining a location of the vehicle on a current road segment using a terrain-based localization system includes comparing a current road profile to candidate road profiles in a crowd-sourced database.

According to another aspect, a method of determining a swerve behavior of a vehicle is disclosed. The method includes obtaining historical heading data sourced from previous drives of a road segment, determining a current heading of a current vehicle traversing the road segment, comparing the current heading to the historical heading data, determining that a swerve behavior is occurring, and changing one or more operating parameters of the current vehicle based on the detected swerve behavior.

In some implementations, changing one or more operating parameters comprises suspending pothole mitigation.

In some implementations, changing one or more operating parameters comprises suppressing event detection.

According to another aspect, a method of controlling travel of an actuator of a suspension system of a vehicle is disclosed. The method includes (a) obtaining, from a terrain-based localization system, road information for a road segment on which the vehicle is traveling. (b) obtaining passive suspension element parameters of the suspension system, (c) determining, a position of an actuator of the suspension system, (d) determining, based on the road information, the passive suspension element parameters, and the position of the actuator, optimal positions for the actuator for traversing the road segment, and (e) initiating, by an actuator controller, one or more actuator commands to position the actuator at the optimal positions as the vehicle traverses the road segment.

In some implementations, the passive suspension element is selected from the group consisting of end stops and secondary springs.

In some implementations, the actuator is an active suspension actuator.

In some implementations, the determination in (d) is also based on occupant comfort, fuel efficiency, and/or vehicle durability.

In some implementations, the one or more actuator commands causes the actuator to preemptively engage one or more of the passive suspension elements.

In some implementations, wherein the road information comprises information on road events.

According to another aspect, a method of creating a road profile estimate is disclosed. The method includes (a) obtaining multiple datasets, each of the multiple datasets representing a road profile estimation for a road segment, the multiple datasets originating from either different vehicles, different sensor sets, or operation at different speeds, (b) determining a range of spatial frequency where each of the multiple datasets have high fidelity. (c) blending the multiple datasets into a single road profile estimate in the spatial frequency domain, and (d) storing the single road profile estimate in a database.

According to another aspect, a method of localizing a vehicle is disclosed. The method includes (a) obtaining a road profile from a map layer for a road segment, (b) obtaining, via one or more sensors of the vehicle, a new dataset representing a road profile estimate for the road segment, (c) determining a range of validity in spatial frequency of the road profile from the map layer, (d) determining a range of validity in spatial frequency of the new dataset, and (c) localizing the vehicle based on comparing the road profile from the map layer and the new dataset in an overlapping range of spatial frequency where both the new dataset and the road profile from the map layer have high fidelity.

According to another aspect, a method of localizing a vehicle is disclosed. The method includes sensing, based on a first sensor system of a vehicle, a first signal corresponding to a first parameter, the first signal having a first availability and a first accuracy. The method also includes sensing, based on a second sensor system of the vehicle, a second signal corresponding to a second parameter, wherein the second sensor system is a terrain-based localization system and the second signal is based on a road profile of a road segment on which the vehicle is traveling, the second signal having a second availability and a second accuracy. The method also includes blending the first signal and the second signal based on the first and second availabilities and the first and second accuracies, wherein a blended signal has a third availability higher than the first availability or the second availability.

In some implementations, the first sensor system comprises at least one of a GPS localization system, a vision-based localization system, a distance-based localization system (e.g., LIDAR/RADAR), or a vehicle motion sensing system (e.g., dead reckoning).

In some implementations, the terrain-based localization employs crowd-sourced terrain maps.

According to another aspect, a method of localizing a vehicle traversing a road segment is disclosed. The method includes (a) determining a first vehicle circumstance at a first time, (b) choosing a first localization method to employ based on the first vehicle circumstance, (c) localizing the vehicle using the first localization method, (d) determining a second vehicle circumstance at a second time, (e) choosing a second localization method to employ based on the second vehicle circumstance, and (f) localizing the vehicle using the second localization method.

In some implementations, the first localization method and the second localization method are selected from the group consisting of GNSS localization, terrain-based localization, and dead reckoning.

In some implementations, the vehicle circumstance and the second vehicle circumstance are selected from the group consisting of weather conditions, overhead obstructions, cellular data availability, and GNSS satellite availability.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION

The accompanying drawings are not intended to be drawn to scale. In the drawings, each identical or nearly identical component that is illustrated in the various figures may be represented by a like numeral. For purposes of clarity, not every component may be labeled in every drawing. In the drawings:

FIG. 5 is a flowchart of a method of determining a swerve behavior of a vehicle.

FIG. 7 is a flow chart of a method of controlling travel of an actuator of a suspension system of a vehicle.

FIG. 8 is a flowchart of a process for blending datasets into a single road profile estimate.

FIG. 9 is a block diagram of a sensor fusion method for localization of a vehicle.

FIG. 10 is a flow chart of a method of localizing a vehicle traversing a road segment.

DETAILED DESCRIPTION

Figure 1:
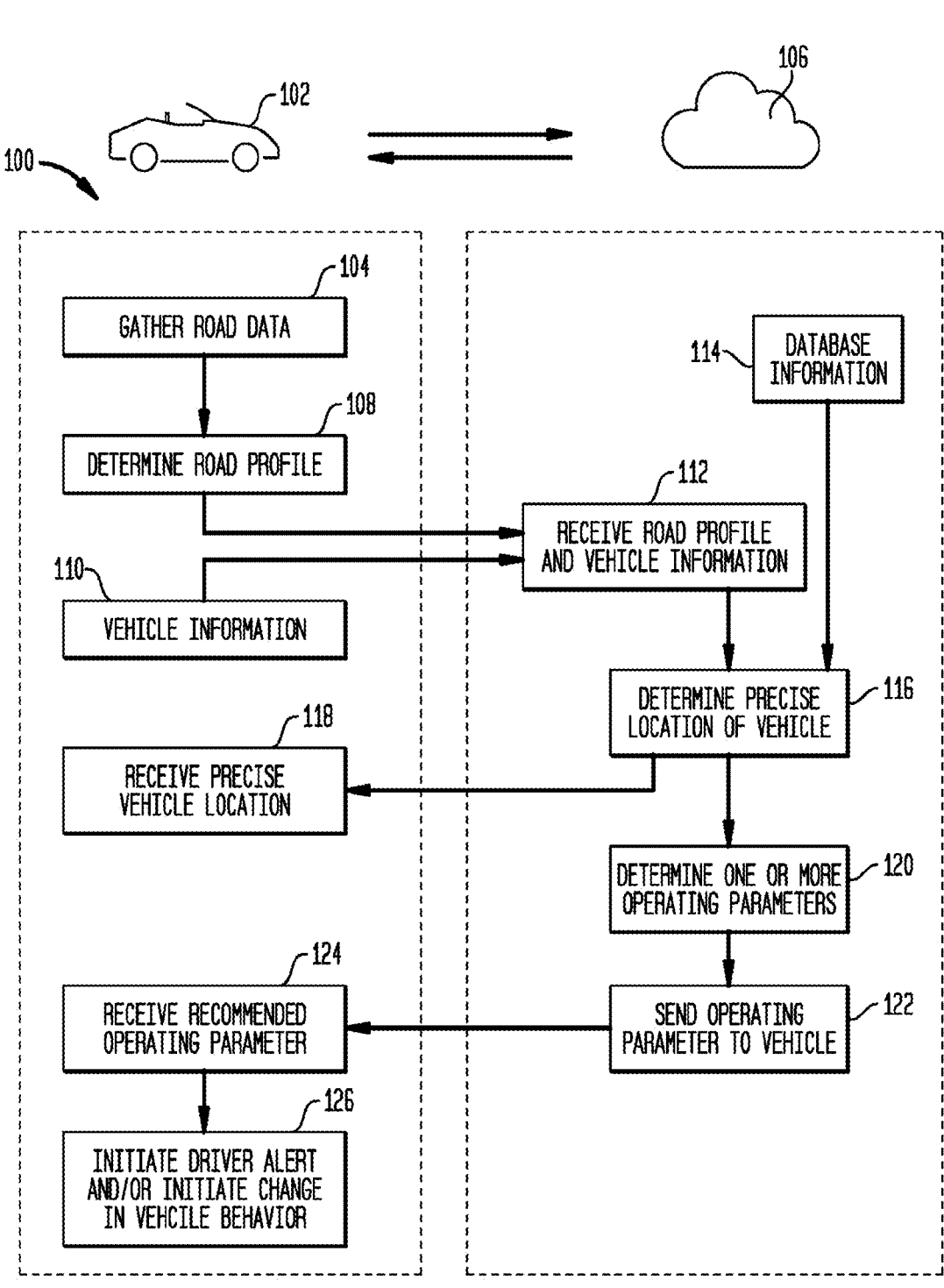
FIG. 1 is a schematic of a terrain-based insights system configured to alert a driver of a vehicle and/or change one or more aspects of vehicle behavior.

A vehicle traveling along a road, autonomously or under the control of a driver, may interact with one or more road surface features that may expose the vehicle and/or one or more vehicle occupants to certain forces or accelerations. Such road features may affect the comfort of vehicle occupants as well as wear-and-tear of the vehicle. The magnitude, direction, and/or frequency content of such forces or accelerations may be a function of the characteristics of one or more road surface features. A typical road may include various types of road surface features, such as for example, road surface anomalies including, but not limited to potholes, bumps, surface cracks, expansion joints, frost heaves, rough patches, rumble strips, storm grates, etc.; and/or road surface properties, including but not limited to road surface texture, road surface composition, surface camber, surface slope, etc. Road surface properties may affect road surface parameters, such for example, the friction coefficient between the tires of a vehicle and the road, traction and/or road-grip. Such parameters may determine how effectively certain maneuvers, such as turning and stopping, may be performed at various speeds and vehicle loading.

The inventors have recognized the benefits of controlling operation of various systems of a vehicle based on the above-noted road surface properties and features. However, the types and characteristics of road surface features and/or properties may vary, for example, from road to road, as a function of longitudinal and/or lateral location on a given road. The effect of vehicle interaction with a given road surface feature, on the vehicle and/or an occupant, may also vary as a function of vehicle speed at the time of the interaction between the vehicle and the road surface feature. The characteristics of a road surface feature may also vary, for example, based on weather conditions, and/or as a function of time. For example, if the road surface feature is a pothole, it may gradually appear and grow, in length, width, and/or depth, over the winter months because of repeated freeze/thaw cycles and then be repaired in a matter of hours or less and effectively disappear. Due to the changing nature, and previously unmapped layout, of a road surface, typically vehicles have sensed the interactions of a vehicle with the road surface and then operated the various autonomous and/or semi-autonomous systems of the vehicle in reaction to the detected characteristics and road surface features the vehicle encounters.

Properties and road surface features of a road surface a vehicle might be driven over may be mapped to provide forward-looking information about the road surface features located along a path of travel of a vehicle. This information about the road surface features ahead of the vehicle may be used to, for example, dynamically tune, prepare, and/or control various automated or partially automated systems in the vehicle (such as for example, suspension systems (e.g., semi or fully active), propulsion systems, adaptive driver assistance systems (ADAS), electric power steering systems (EPS), antilock braking systems (ABS), etc.). The inventors have recognized that when there is a physical interaction between a vehicle and a road surface feature, the vehicle is exposed to one or more perceptible forces that are induced by the interaction. Thus, with a preview of the road ahead, a vehicle controller may more effectively react to road surface features when there is a physical interaction between the road surface feature and the vehicle.

While information about a road surface may be useful for the control of various systems of a vehicle, the inventors have recognized that there are challenges to obtaining and using such road surface information. One such challenge is knowing with sufficient accuracy and resolution the location of the vehicle, so that the information regarding road features ahead of the vehicle may be used to more effectively control the vehicle. For example, if the location of the vehicle is not sufficiently accurate, a vehicle controller may take an action that does not mitigate a physical interaction between the vehicle and the road feature. As another example, if the location of the vehicle is not sufficiently accurate, a vehicle controller may take an action that worsens a physical interaction between the vehicle and the road feature or otherwise worsens a vehicle occupant's comfort. For example, an accuracy on Global Navigation Satellite Systems (GNSS) location tends to be on the order of about 7 m to 30 m. With such an accuracy, a vehicle would not only be unable to tell when a vehicle would interact with a particular road surface feature (e.g., a pothole) but it also would be unable to tell if the vehicle would interact with that road surface feature in any manner.

In view of the above, the inventors have recognized that localization systems and methods incorporating terrain-based localization may offer better resolution than a purely GNSS based system. In a terrain-based localization system, as a vehicle travels along a road, a measured road profile may be obtained by measuring vertical motion of a portion of the vehicle using one or more motion sensors attached to the vehicle. This measured road profile may be compared with a reference road profile, and based at least in part on this comparison, the position of the vehicle along the road may be determined. However, the inventors have recognized that continuous pattern matching between a measured profile and a reference profile may require substantial data transmission and/or manipulation. That is, a single vehicle may need to stream sufficient road information such that the measured road profile may be continuously compared to the reference road profile while the vehicle is controlled based on the forward road information. The network bandwidth requirements may be substantial for a system employing a plurality of vehicles across an entire road network such that implementing such a network may not be commercially feasible. Additionally, continuous pattern matching between a measured profile and a reference profile may require computing power beyond what is commercially feasible to employ in a vehicle. If the computation is done remotely, such continuous pattern matching further requires network bandwidth which may already be commercially unfeasible.

In view of the above, the inventors have recognized the benefits of a road segment organizational structure for road information and related methods that provide accurate terrain-based localization in a discretized manner, thereby reducing network and computational requirements to implement terrain-based localization. Each road segment may have a predetermined length, such that a road is broken into multiple road segments. As a vehicle approaches an end point of a road segment, a road profile of the road segment may be compared with the last portion of a measured road profile with an approximately equivalent length. In this manner, a vehicle may verify its precise position based on terrain once per road segment of a predetermined length, a method which is less computationally and network bandwidth intensive.

The inventors have recognized that, given computational and/or bandwidth limitations, it may be advantageous to implement a terrain-based localization method such that the comparison between observed data and reference data occurs only at predetermined intervals (e.g., time or distance intervals). However, in between these precise determinations of a vehicle's location using terrain-based localization, a vehicle's location may become less certain as the vehicle travels further away from the last recognized road surface feature. Thus, in certain embodiments, in between these predetermined intervals and/or road surface locations, dead-reckoning may be used to estimate the location of the vehicle (e.g., the position of the vehicle along a road) based on the previously identified location (e.g., the previously identified position along the road). For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, dead reckoning may be used to track the vehicle's position as it subsequently travels along the road. During the period of dead reckoning, new data from the one or more sensors may be collected and optionally processed to yield new observed data. In certain embodiments, upon determining that the vehicle has traveled a predetermined distance since the first point in time, the new observed data may be compared with reference data. Based at least upon this second comparison, the position of the vehicle along the road at a second point in time may be determined. The process may then be repeated as the vehicle traverses sequentially located road segments, such that dead reckoning is used to track further movement of the vehicle, until it is determined that the vehicle has traveled the predetermined distance since the second point in time the location was determined. Upon this determination, terrain-based localization may be used to localize the vehicle at a third point in time. Thus, in some embodiments comparisons may be carried out intermittently at predetermined distance intervals, which may be constant intervals, instead of continuously comparing measured (e.g., the collected data and/or the processed data) data with reference data. Alternatively or additionally, terrain-based localization may be carried out upon determining that a predetermined time interval has passed since the first or previous point in time, rather than a predetermined distance interval. During these time/distance intervals, dead-reckoning may be used, exclusively or in addition to other localization systems that may be used to track the location (e.g., coordinates or position) of the vehicle based on a previously established location. Additionally, while the use of constant time and/or distance intervals are primarily disclosed herein, it should be understood that predetermined time and/or distance intervals used when determining a vehicle's location on different road segments may either be constant and/or variable between each other along different road segments as the disclosure is not limited in this fashion.

The inventors have also recognized that terrain-based determination of location for a vehicle may be supplemented by GNSS location estimations and the use of discretized road segments. That is, rather than using dead reckoning to perform terrain-based comparisons in discrete time and/or distance intervals, a location estimation from a GNSS system may be employed. For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, a GNSS may be used to track the vehicle's position as it subsequently travels along the road which may be used to determine a distance the vehicle has traveled along the road since the vehicle location was determined. During the period of GNSS tracking, new data from the one or more sensors may be collected and optionally processed to yield new observed data. In certain embodiments, upon determining that the vehicle has traveled a predetermined distance since the first point in time based at least in part on the GNSS tracking data, the new observed data may be compared with reference data. Based at least upon this second comparison, the position of the vehicle along the road at a second point in time may be determined. The process may then be repeated, such that GNSS tracking is used to track further movement of the vehicle, until it is determined that the vehicle has traveled the predetermined distance since the second point in time. Upon this determination, terrain-based localization may be used to localize the vehicle at a third point in time. Thus, in some embodiments, comparisons may be carried out intermittently at predetermined distance intervals, which may be constant intervals, or in some instances non-constant predetermined distance intervals associated with the different road segments, instead of continuously comparing measured (e.g., the collected data and/or the processed data) data with reference data. In some cases, employing a GNSS instead of dead reckoning may reduce error related to the predetermined distance. In some embodiments, GNSS may be used in combination with dead reckoning to further reduce error related to the predetermined distance, as the present disclosure is not so limited.

In some embodiments, in a road segment architecture, a given road may be segmented into a series of road segments of predetermined lengths that in some embodiments may be equal to each other, though embodiments in which road segments of unequal predetermined lengths are used are also contemplated. Each road segment may include one or more road profiles that may be employed for terrain-based localization as described herein.

The road profiles may be obtained by measuring vertical motion of a portion of a vehicle using one or more motion sensors attached to the vehicle as the vehicle traverses the road segment. The road segments of predetermined equal lengths or unequal lengths may be referred to as "slices". In certain embodiments, consecutive road segments may be arranged in a contiguous fashion such that the end point of one road segment approximately coincides with the starting point of a subsequent road segment. In some embodiments, the consecutive road segments may be non-overlapping, such that an end point of one road segment coincides with a starting point of a subsequent road segment. Alternatively, in some embodiments, road segments may overlap, such that the start point of a subsequent road segment may be located within the boundaries of a previous road segment. Road segments may be, for example, any appropriate length, including, but not limited to, ranges between any combination of the following lengths: 20 meters, 40 meters, 50 meters, 60 meters, 80 meters, 100 meters, 120 meters, 200 meters or greater. In some embodiments, a road segment may have a length between 20 and 200 meters, 20 and 120 meters, 40 and 80 meters, 50 and 200 meters, and/or any other appropriate range of lengths. Other lengths that are longer or shorter than these lengths are also contemplated, as the present disclosure is not so limited. In certain embodiments, the length of the road segment into which a road is divided may depend on the type of road and/or the average speed travelled by vehicles on the road or other appropriate considerations. For example, on a single lane city road, vehicles may generally travel at relatively low rates of speed as compared to multilane highways. Therefore, on a city road (or other road with relatively low travel speeds) it may be advantageous or otherwise desirable to have relatively shorter road segments (e.g., between 20 and 60 meters) than on highways or other roads with relatively high travel speeds (e.g., between 80 and 120 meters), such that each road segment may correspond to an approximate average travel time from start to end of the road segment regardless of average travel speed on the road.

In some embodiments, a method of localizing a vehicle using road segments includes measuring a road profile with a vehicle. The method may also include determining is a vehicle is within a threshold distance of a road segment end point. For example, in some embodiments, determining the vehicle is within a threshold distance of a road segment endpoint includes estimating a location of the vehicle with a GNSS, dead reckoning from a last known vehicle location, and/or any other appropriate localization method. The method may also include comparing a reference road profile corresponding to the end portion of the road segment along a vehicle's path of travel to the measured road profile. In some embodiments, a last portion of the measured road profile may be compared to the reference road profile as the vehicle traverses the road segment, where the last portion of the measured road profile and reference road profile have approximately equal (e.g., equal) lengths. The method may include determining a correlation between the measured road profile and the reference road profile, for example, using a cross-correlation function or another appropriate function that assesses similarity between the measured road profile and the reference road profile (e.g., dynamic time warping, etc.). The method may also include determining if the correlation between the measured road profile and the reference road profile exceeds a threshold correlation. The threshold correlation may be predetermined based at least in part on a road type, as will be discussed in detail further below. If the correlation exceeds the threshold correlation, the location of the vehicle may be determined, as the position of the vehicle may correspond to the location of the road segment end point. If the correlation does not exceed the threshold correlation, the location of the vehicle may not be determined, and the method may continue with the vehicle advancing down the road and re-determining a correlation between the measured road profile (including additional data measured while advancing down the road) and the reference road profile. In addition to the above, as the vehicle approaches the endpoint of the last portion of the road profile, the correlation between the measured road profile and the reference road profile may increase to a peak at a location corresponding approximately to the endpoint of the reference road profile. Accordingly, in some embodiments, the method may include detecting a peak in the correlation between the measured road profile and the reference road profile while the vehicle moves through an area within a threshold distance of the road segment end point. Additional details of such peak detection are discussed in further detail below.

The various embodiments disclosed herein are related to determining the location of a vehicle on a road surface and/or for creating maps of road segments including information that may be used to locate a vehicle on a road surface. Such information may provide a priori information to a vehicle about one or more road surface features and/or road surface properties located on the road segment along an upcoming portion of the path of travel of the vehicle. As noted previously, by knowing this information prior to the vehicle encountering a given portion of a road segment, operation of one or more systems of a vehicle, e.g., autonomous and/or semi-autonomous systems of the vehicle, may be at least partly controlled based on this information. Accordingly, any of the embodiments disclosed herein may provide information, e.g., vehicle, road surface feature, and/or road parameter locations, that may be used by one or more vehicles to control one or more vehicle systems. Thus, in some embodiments, one or more systems of a vehicle may be controlled based at least in part on a determined location of a vehicle, dead reckoning, a reference profile of a road segment, and combinations of the foregoing. Examples of systems that may be controlled may include suspension systems (semi or fully active), propulsion system, advanced driver assistance systems (ADAS), electric power steering (EPS), antilock braking systems (ABS), navigation systems of autonomous vehicles, and/or any other appropriate type of vehicle system.

According to exemplary embodiments described herein, a vehicle may include one or more wheels and one or more vehicle systems that are controlled by a vehicle control system. A vehicle control system may be operated by one or more processors. The one or more processors may be configured to execute computer readable instructions stored in volatile or non-volatile computer readable memory that when executed perform any of the methods disclosed herein. The one or more processors may communicate with one or more actuators associated with various systems of the vehicle (e.g., braking system, active or semi-active suspension system, driver assistance system, etc.) to control activation, movement, or other operating parameter of the various systems of the vehicle. The one or more processors may receive information from one or more sensors that provide feedback regarding the various portions of the vehicle. For example, the one or more processors may receive location information regarding the vehicle from a Global Navigation Satellite System (GNSS) such as a global positioning system or other positioning system. The sensors on board the vehicle may include, but are not limited to, wheel rotation speed sensors, inertial measurement units (IMUs), optical sensors (e.g., cameras, LIDAR), radar, suspension position sensors, gyroscopes, etc. In this manner, the vehicle control system may implement proportional control, integral control, derivative control, a combination thereof (e.g., PID control), or other control strategies of various systems of the vehicle. Other feedback or feedforward control schemes are also contemplated, and the present disclosure is not limited in this regard. Any suitable sensors in any desirable quantities may be employed to provide feedback information to the one or more processors. It should be noted that while exemplary embodiments described herein may be described with reference to a single processor, any suitable number of processors may be employed as a part of a vehicle, as the present disclosure is not so limited.

According to exemplary embodiments described herein, one or more processors of a vehicle may also communicate with other controllers, computers, and/or processors on a local area network, wide area network, or internet using an appropriate wireless or wired communication protocol. For example, one or more processors of a vehicle may communicate wirelessly using any suitable protocol, including, but not limited to, WiFi, GSM, GPRS, EDGE, HSPA, CDMA, and UMTS. Of course, any suitable communication protocol may be employed, as the present disclosure is not so limited. For example, the one or more processors may communicate with one or more servers from which the one or more processors may access road segment information. In some embodiments, one or more servers may include one more server processors configured to communicate in two-way communication with one or more vehicles. The one or more servers may be configured to receive road profile information from the one or more vehicles, and store and/or utilize that road profile information to form road segment information. The one or more servers may also be configured to send reference road profile information to one or more vehicles, such that a vehicle may employ terrain-based localization according to exemplary embodiments described herein, and one or more vehicle systems may be controlled or one or more parameters of the one and/or more vehicle systems may be adjusted based on forward looking road profile information.

In the various embodiments described herein, in some instances, a method of terrain-based localization may be based on peak detection of a cross-correlation between a reference road profile and a measured road profile as a vehicle passes through a road segment end point. In some embodiments, a measured road profile of a predetermined length approximately equivalent to that of the reference road profile may be cross correlated to the reference road profile once the vehicle enters a threshold range of the road segment end point to obtain a correlation between 0 and 1. In some embodiments, the threshold range of the road segment end point may be less than 15 m, 10 m, 5 m, and/or any other appropriate range. In some embodiments, the threshold range of the road segment end point may be based at least partly on a resolution of a GNSS onboard the vehicle. In such embodiments, the threshold range may be approximately equal (e.g., equal) to the resolution of the GNSS.

According to exemplary embodiments described herein, once a vehicle enters the threshold range of the road segment end point, a cross correlation between the measured road profile and reference road profile may be performed and the correlation determined. If the correlation does not exceed a threshold correlation, the vehicle location may not be determined, and the process of terrain-based localization may continue with the vehicle continuing to move down the road. While the vehicle is within the threshold range of the road segment end point, a correlation may be re-determined effectively continuously (e.g., at each time step) as the measured road profile includes the most recent data from the vehicle and removes the oldest data falling outside of the predetermined length. Each time a correlation is determined, it may be determined if the correlation exceeds the threshold correlation. Once the correlation exceeds the threshold correlation at a given time step, it may be determined that the vehicle was located at the road segment end point at that time step. In some embodiments, a peak detection algorithm may be applied to determine if the correlation between the measured road profile and reference road profile is a maximum correlation. In some such embodiments, a slope of the correlation may be determined between the most recent time step and earlier time steps. In some embodiments, a peak may be determined where the slope is negative, and the correlation is decreasing after the correlation exceeded the threshold correlation. Of course, any suitable peak detection function may be applied, as the present disclosure is not so limited. In some embodiments, a threshold correlation may be greater than or equal to 0.6, 0.7, 0.8, 0.9, and/or any other appropriate value. In some embodiments, the threshold correlation may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and a threshold correlation for a non-highway road may be greater than or equal to 0.5.

According to exemplary embodiments described herein, road segment information may be stored in one or more databases onboard a vehicle and/or in one or more remotely located servers. In some embodiments, a database may be contained in non-transitory computer readable memory. In certain embodiments, the database may be stored in memory that is exclusively or partially located remotely (e.g., "in the cloud") from the vehicle, and the database and the vehicle may exchange information via a wireless network (e.g., a cellular network (e.g., 5G, 4G), WiFi, etc.). Alternatively, in some embodiments, the database may be stored in non-transitory memory that is located on the vehicle. In certain embodiments. Road segments may be specific for a direction of travel, such that for "two-way" roads (i.e., roads which support simultaneous travel in opposing directions), there may be a distinct set of road segments for each direction of travel (e.g., a first set of road segments for travel in a first direction and a second set of distinct road segments for travel in a second direction).

As used herein, road profile refers to any appropriate description or characterization of a road surface as a function of distance. For example, a road profile may refer to a road height profile that describes variations of height of a road's surface as a function of distance along a given road segment. Alternatively or additionally, a road profile may refer to mathematically related descriptions of road surface. For example, a road profile may refer to a "road slope" profile that describes road slope as a function of distance along a road segment. A road profile of a road segment may be obtained, for example, by measuring—as a vehicle traverses the road segment—vertical motion (e.g., acceleration data, velocity data, position data) of a portion of the vehicle (e.g., to the vehicle's wheel, wheel assembly, or other part of the unsprung mass; or a portion of the vehicle's sprung mass), and optionally processing this data (e.g., transforming it from time to distance domains based on operating speed, integrating the data with respect to time, filtering it (e.g., to remove wheel hop effects), etc.). For example, if vertical acceleration of a wheel is measured using an accelerometer attached to the wheel, then vertical velocity of the wheel may be obtained through integration, and vertical height obtained through further integration. With knowledge of the operating speed of the vehicle (that is, the speed at which the vehicle traverses the road segment), vertical height with respect to distance travelled may be obtained. In some embodiments, further filtering may be advantageous. In one example, a road height profile may be obtained from the wheel's vertical height data (e.g., as determined by measuring acceleration of the wheel) by applying a notch filter or low-pass filter (to, e.g., measured vertical acceleration of the wheel) to remove effects of wheel hop. A road profile may incorporate information describing or characterizing discrete road surface anomalies such as, for example, potholes (or other "negative" events) and/or bumps (or other "positive" events). Additionally or alternatively, a road profile may incorporate information about distributed road surface characteristics such as road roughness and/or road surface friction. Additionally or alternatively, a road profile may incorporate information about any parameter that may be measured that is related to a motion and/or response of the vehicle to inputs from the road to the vehicle (e.g., forces, accelerations, heights, etc.).

According to exemplary embodiments described herein, if a vehicle travels on a road (or section of a road) for which no reference road profile data exists, reference data (including, e.g., a reference road profile, characterization of the road's surface, and/or the presence of irregular events such as bumps or portholes) may be generated by collecting motion data from one or more motion sensors (e.g., accelerometers, position sensors, etc.) attached to one or more points of the vehicle (e.g., attached to a wheel of the vehicle, a wheel assembly of the vehicle, a damper, another part of the unsprung mass of the vehicle, or a part of the sprung mass of the vehicle). Data collected from a first traversal of the road or road section may then be used to generate the reference data that may be stored in a database and associated with the particular road segment of the road or road section. Alternatively, data may be collected from a plurality of vehicle traversals and merged (e.g., averaged using a mean, mode, and/or median of the reference data) together to generate reference data.

According to exemplary embodiments described herein, the location of a vehicle may be estimated or at least partially determined by, for example, absolute localization systems such as satellite-based systems. Such systems may be used to provide, for example, absolute geocoordinates (i.e., geographic coordinates on the surface of the earth such as longitude, latitude, and/or altitude) of a vehicle. Satellite based systems, generally referred to as a Global Navigation Satellite System (GNSS), may include a satellite constellation that provides positioning, navigation, and timing (PNT) services on a global or regional basis. While the US based GPS is the most prevalent GNSS, other nations are fielding, or have fielded, their own systems to provide complementary or independent PNT capability. These include, for example: BeiDou/BDS (China), Galileo (Europe), GLONASS (Russia), IRNSS/NavIC (India) and QZSS (Japan).

Systems and methods according to exemplary embodiments described herein may employ any suitable GNSS, as the present disclosure is not so limited.

According to exemplary embodiments described herein, dead reckoning may either be used to determine a location of the vehicle at a time point after the vehicle's last known location using the vehicle's measured path of travel and/or displacement from the known location. For example, the distance and direction of travel may be used to determine a path of travel from the known location of the vehicle to determine a current location of the vehicle. Appropriate inputs that may be used to determine a change in location of the vehicle after the last known location of the vehicle may include, but are not limited to, inertial measurement units (IMUs), accelerometers, sensor on steering systems, wheel angle sensors, relative offsets in measured GNSS locations between different time points, and/or any other appropriate sensors and/or inputs that may be used to determine the relative movement of a vehicle on the road surface relative to a previous known location of the vehicle. This general description of dead reckoning may be used with any of the embodiments described herein to determine a location of the vehicle for use with the methods and/or systems disclosed herein.

In some cases, roads may include more than one track (e.g., lane) for each direction of travel, and the road profile may differ for each track. It may not be known in a reference database how many tracks (e.g., lanes) are in a road or road segment, which may lead to difficulties when generating reference data for the road or road section. For example, if a reference road profile for a given road is generated by a vehicle travelling in the left-most lane of a multi-lane road, subsequent attempts to use said reference road profile to localize a vehicle travelling in the right-most lane may fail due to differences in road surface between the left-most lane and the right-most lane. Thus, knowing both how many tracks a road has, and in which track a vehicle is travelling, is desirable for both generating reference road profiles, subsequent localization, and for using the information for controlling a vehicle and/or one or more vehicle systems. Prior attempts at determining a track of a road profile have raised computational challenges, such as data storage for road profiles of multi-lane use (e.g., a lane change) which are not useful for the majority of vehicle traversals of a road segment which occur in a single lane.

In view of the above, the inventors have recognized the benefits of a road segment organizational structure in which multiple road surface profiles may be associated with a single road segment. The road segment structure allows multiple road profiles to be associated with a road segment in a manner that is less data and computationally intensive. Additionally, the inventors have recognized the benefits of a road segment organizational structure which employs a threshold-based approach to collecting and storing road profiles that may be associated with a road track. In particular, the inventors have appreciated that until a sufficiently large number of stored road profiles is reached, clustering and/or merging road profiles may result in inaccurate road profile information.

In some embodiments, a method of identifying a track (e.g., a lane) of a road profile for a road segment includes measuring a road profile of the road segment with any appropriate onboard sensor as disclosed herein as the vehicle traverses the road segment (e.g., employing a vehicle according to exemplary embodiments described herein). A measured road profile may be transmitted to a server each time a vehicle traverses the road segment, such that a plurality of vehicles may transmit a plurality of measured road profiles to the server. The method may also include determining if the number of stored road profiles exceeds a threshold number of road profiles. The threshold number of road profiles may be predetermined to allow a sufficient number of road profiles to be collected prior to data manipulation. In some cases, the threshold number of road profiles may be based on the type of road segment. For example, a high-speed road such as a highway may have a greater threshold number of road profiles as highways typically include more lanes than low speed roads. In some embodiments, the threshold number of road profiles may be between 2 and 64 road profiles, between 8 and 12 road profiles, and/or any other suitable number. If the server receives a road profile from the vehicle and the threshold number of stored road profiles is not exceeded, the received measured road profile may be stored and associated with the road segment. However, if the threshold number of road profiles is exceeded by the received measured road profile, the method may include identifying the most similar two road profiles of the measured road profile and stored road profiles. The most similar two road profiles may be identified based on a cross-correlation function performed on each pair of road profiles, and comparing the resulting degree of similarity values. If the degree of similarity of the two most similar road profiles exceeds a predetermined similarity threshold, the two most similar road profiles may be merged into a merged road profile. If the degree of similarity of the two most similar profiles does not exceed a similarity threshold, the oldest road profile may be discarded, and the newly measured road profile stored. In this manner, similar road profiles may be retained by the server, whereas outlying road profiles will be eventually removed. As similar road profiles are merged, information regarding how many road profiles have been merged into a single merged profile may be kept as metadata, with greater numbers of road profiles in a single merged profile representing a track (e.g., lane) of a road segment.

In some embodiments, a degree of similarity may be a value between 0 and 1 which is the output of a cross-correlation function. In some embodiments, a similarity threshold for merging road profiles may be greater than or equal to 0.6, 0.7, 0.8, 0.9, and/or any other appropriate value. In some embodiments, the similarity threshold may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and threshold correlation for a non-highway road may be greater than or equal to 0.5.

In some embodiments, if a set of road profiles includes a sufficiently large number of road profiles (e.g., exceeding a threshold number of road profiles), a correlation clustering algorithm is conducted on the set of road profiles. A number of appropriate correlation clustering algorithms are known in the art, including, for example, hierarchal or partitional clustering methods (e.g., k-means clustering, c-means clustering, principal component analysis, hierarchal agglomerative clustering, divisive clustering, Bayesian clustering, spectral clustering, density-based clustering, etc.) Subsequent to a correlation clustering process, the set of road profiles may be divided into one or more clusters, where each road profile contained within a given cluster is substantially similar to each other road profile contained within the given cluster. For example, the set of road profiles in a road segment may be divided into at least a first cluster of road profiles and a second cluster of road profiles, where each road profile in the first cluster is substantially similar to each other road profile in the first cluster, and each road profile in the second cluster is substantially similar to each other road profile in the second cluster. In some embodiments, a similarity of the plurality of road profiles in each cluster may be more similar to other road profiles in the same road profile as compared to road profiles in other clusters as determined using any appropriate comparison method including, for example, a cross correlation function as described herein. In certain embodiments, each cluster may be considered as corresponding to a track (e.g., a lane) of the road, road segment, or road segment. In certain embodiments, all of the road profiles within a given cluster may be merged (e.g., averaged), in order to obtain a single track-merged road profile. This merged road profile may serve as the reference road profile for a given track within a road segment (e.g., for future terrain-based localization or future preview control of vehicles (e.g., controlling one or more vehicular systems based on knowledge of upcoming road characteristics)), and may be stored in the database and associated with a specific track in a road segment. This merging may be carried out for each identified cluster. In certain embodiments, the clustering algorithm may be periodically repeated (e.g., after a certain number of new road profiles are collected for a given road segment), Alternatively, the clustering algorithm may be repeated after each new road profile is collected to determine which cluster the new profile belongs in.

In some embodiments, rather than considering each cluster to correspond to a track, only clusters having a number of road profiles that exceed a threshold number of road profiles are considered to correspond to tracks. A track represents a path that vehicles take when traversing a road segment. For example, a cluster with a single road profile or a small number of profiles less than the threshold number of road profiles, may be considered an outlier, rather than a separate track. Outliers may occur, for example, when a vehicle experiences an atypical event while traversing a road segment (e.g., the vehicle may change lanes within a road segment, or may traverse some temporary debris or garbage on the road that is not typically present). In certain embodiments, road profiles considered outliers may be deleted after some amount of time in order to save space, not cause confusion, or other appropriate reasons.

According to exemplary embodiments described herein, one or more road profiles may be merged into a merged road profile. In some embodiments, merging two or more road profiles may include averaging the two or more profiles. In some embodiments, merging the two or more road profiles may include accounting for the range of frequencies over which the information provided in a measured road profile is valid. In some instances, two or more measured road profiles may have overlapping, but not identical, valid frequency ranges. In such instances, the overlapping portions may be averaged while the non-overlapping portions may be left unchanged. A reference profile created from multiple overlapping, but not identical, measured road profiles may have a wider valid frequency range than an individual measured road profile. According to such an embodiment, sensors of varying quality and frequency may be merged into a merged profile without distorting the merged road profile, as the most useable data from each measure profile may be combined.

Of course, any suitable technique for merging two or more road profiles may be employed, as the present disclosure is not so limited.

In some embodiments, tracks of consecutive road segments may be linked in the database. These links may form a directed graph showing how tracks on consecutive road segments are visited. For example, a given road may include a first road segment and a second road segment, where the first road segment and second road segment are consecutive. If it is determined that the first road segment contains two tracks (which, in some embodiments, may correspond to physical lanes on a roadway) and the second road segment contains two tracks, each track of the first road segment may be linked in the database to a respective track in the second road segment. This "track linking" may be carried out based on historical trends—for example, if it is observed that a majority of vehicles, or other appropriate threshold, travel from one track (i.e. first road profile) in a first road segment to a corresponding track (i.e. second road profile) in the second road segment those tracks may be linked together in a database containing the road profiles of the various road segments. For example, if vehicles preferably travel from "track 1" in the first road segment to "track 1" in the second road segment, then track 1 of the first road segment may be linked to track 1 in the second road segment. These linkages may be used to predict travel, such that if a vehicle at a given time is localized to "track 1" in the first road segment, it may be assumed that the vehicle is likely to continue to "track 1" in the second road segment. Accordingly, a vehicle may use a track identification to prepare and/or control one or more vehicle systems for an upcoming road profile.

In some embodiments, a road profile may include additional information regarding the vehicle traversal to assist with clustering and/or lane identification according to exemplary embodiments described herein. For example, in some embodiments, a road profile may include an average speed which may be determined by averaging the speeds of vehicles traversing the road segment when measuring the various measured profiles used to determine the road profile. According to such an example, the average speed may assist in lane identification and clustering, as lanes may differ in average speed. For example, in the U.S. a right-most lane may have the lowest average speed whereas the left-most land has the highest average speed. Accordingly, a first track with a lower average speed may be associated with a right-most lane and a second track with a higher average speed may be associated with a left-most lane of a roadway. Of course, any suitable information may be collected and employed to identify a vehicle lane of a road segment, as the present disclosure is not so limited.

As used herein, the term "location" may refer a location of a vehicle expressed in absolute coordinates, or it may refer to a position of a vehicle along a road. A position of a vehicle may be expressed as a distance relative to some feature of a road (e.g., as a distance relative to the start of a road, relative to some intersection, relative to some feature located on the road, etc.).

It should be understood that while specific types of sensors for measuring a road profile are described in the embodiments below, any appropriate type of sensor capable of measuring height variations in the road surface, or other parameters related to height variations of the road surface (e.g., accelerations of one or more portions of a vehicle as it traverses a road surface) may be used as the disclosure is not so limited. For example, inertial measurement units (IMUs), accelerometers, optical sensors (e.g., cameras, LIDAR), radar, suspension position sensors, gyroscopes, and/or any other appropriate type of sensor may be used in the various embodiments disclosed herein to measure a road surface profile of a road segment a vehicle is traversing as the disclosure is not limited in this fashion.

As used herein, an average may refer to any appropriate type of average used with any of the parameters, road profiles, or other characteristics associated with the various embodiments described herein. This may include averages such as a mean, mode, and/or median. However, it should be understood that any appropriate combination of normalization, smoothing, filtering, interpolation, and/or any other appropriate type of data manipulation may be applied to the data to be averaged prior to averaging as the disclosure is not limited in this fashion.

As used herein, a road profile may correspond to a "track" or a "lane", and in some instances these terms may be used interchangeably. As used herein, a "track" may be a path that one or more vehicles take to traverse a road segment. In some embodiments, "clusters" correspond to "tracks" and/or "lanes". In some embodiments, "tracks" correspond to physical "lanes" on a road. In other embodiments, "tracks" do not correspond to physical "lanes" on a road.

In the various embodiments disclosed herein, reference may be made to obtaining particular forms of data including, for example, road profiles, road surface information, road event data, road condition data, weather information, vehicle information, etc. It should be understood that obtaining the desired data may correspond to any appropriate manner in which the data may be obtained. This may include, for example: recalling data previously stored in non-transitory computer readable media; receiving real-time measurement signals from one or more associated sensors or systems; receiving transmissions from a remotely located server, vehicle, or other system; and/or any other appropriate method of obtaining the desired data as the disclosure is not limited in this fashion.

In the various embodiments described herein, reference may be made to outputting a particular parameter, indication, or other appropriate type of information. It should be understood that outputting may refer to any appropriate type of output of the indicated information including, for example: outputting the information to a user using a display system; storing the information in non-transitory computer readable media; transmitting the information to another computing device such as a remotely located vehicle and/or server; providing the information to another system and/or computing module for subsequent use; and/or any other appropriate method of outputting the information as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Terrain-Based Insights for Vehicle Systems

Referring to FIG. 1, a system 100 including an Advanced Driver Assistance System (ADAS) configured to operate based on terrain-based insights is shown. A vehicle 102, is configured to gather (104) road data (e.g., using one or more sensors (e.g., wheel accelerometers, body accelerometers, IMUs, etc.)) and determine a road profile 108 based on that road data using one or more microprocessors. The vehicle 102 is also configured to send road profile information to a cloud computing system 106 which may include a cloud database. In some instances, the road data, or some adaptation of the road data, is sent to the cloud computing system and a road profile is determined at the cloud computing system. The vehicle 102 is also configured to send vehicle information 110 to the cloud computing system 106. Vehicle information 110 may include a GPS location of the vehicle 102. Vehicle information 110 may include, for example, a make of the vehicle, a model of the vehicle, a type of vehicle (e.g., sports car, sedan, SUV, pickup truck, etc.), information on equipment of the vehicle (e.g., sensor positioning, sensor details, etc.), a driving type of the vehicle (e.g., autonomous, semi-autonomous, human-driven, etc.), an estimated tire type, an estimated tire wear condition, etc. Vehicle information 100 may also include, for example, information about a driver of the vehicle (e.g., a driver profile, an average reaction time, etc.).

The cloud computing system 106 receives (112) the road profile 108 and at least one piece of vehicle information 110. Based on the received road profile 108, the vehicle information 110, and cloud database information 114, the cloud computing system 106 determines (116) a precise location of the vehicle 102. In some implementations, the receiving step 112 may not occur and the database information 114 may be sent to the vehicle where the determination step 116 may occur locally at the vehicle. In some implementations, the entire database or parts of the database may be locally stored at a preceding time, and the process described here may be entirely performed locally with no need to connect to the cloud until more up-to-date information is desired. The database information 114 may include stored road profiles from previous drives over road segments performed by the vehicle 102 or other vehicles. Determining a precise location of the vehicle may include matching the received road profile 108 and with a stored road profile from the cloud database using the received road profile 108 and a GPS location of the vehicle 102 received by the cloud computing system 106. As used herein, the term "precise location" refers to being within 1-meter and/or a location accuracy that is more precise than a typical GPS or other GNSS system, for example by one or more orders of magnitude. The precise location is received (118) by the vehicle 102.

The cloud computing system 106 is configured to determine (120), using the road profile 108, and vehicle information 110, a recommended vehicle operating parameter for traversing at least a portion of an upcoming road segment, an upcoming road event, etc. The recommended vehicle operating parameter may be calculated (120) in the cloud computing system 106 using previous road data (e.g., road condition information, road event information, etc.) from other vehicles that previously drove on the upcoming road segment (or from the present vehicle's previous traversals of the upcoming road segment), which may be contained in the database information 114. In some implementations, the cloud computing system may be stored locally in the vehicle and may connect to a remote server only sporadically or not at all. The cloud computing system 106 may send (122) the recommended vehicle operating parameter to the vehicle 102. Upon receiving (124) the recommended vehicle operating parameter, the vehicle 102 may initiate (126) a driver alert (e.g., by presenting a graphic on a screen in the vehicle, a heads-up display, via an audible sound, via haptic feedback, etc.) and/or initiate a change in vehicle behavior. In some implementations, initiating a change in vehicle behavior may include, for example, initiating a command at an autonomous driving controller of the vehicle to change a speed of the vehicle. In some implementations, initiating a change in vehicle behavior may include initiating a braking command to slow down the vehicle or limiting power to a propulsion engine or ICE motor.

Different Consumption Algorithms or Gains Based on Localization Confidence

In general, location recognition relies on a system behaving as expected, on the sensors having inputs to the system working as expected, and on a prescribed expected sensor output being correct. Any deviation from these may result in a poor location recognition, characterized for example by poor correlation between the actual and expected outputs or by poor recognition of individual beacons or events that are expected along the path. In a typical system, the quality of the location recognition will determine either an accurate location along the path, or a missed location recognition.

Described herein is a method for recognizing the location of a system along a path that is used to determine an upcoming desired motion of the system and commands for a set of actuators configured to carry out the desired motion. In some implementations, the system may be, for example, a robotic arm, a road vehicle, an autonomous road vehicle, etc. The set of actuators may be, for example, a variable damper system, an active suspension system, an active roll stabilizer system, a rear steering system, a robotic arm's actuators, etc. Recognizing a location of the system along the path requires matching a sensor output acquired at a current time to a sensor output predicted ahead of time, either from a previous path traversal, or a path traversal by another system at a previous time, or a sensor output from a model of the system. Knowing where the system currently is along the path allows the system to keep following its intended command, for example, a commanded damping force in a semiactive suspension system for a given location along a roadway, or a commanded trajectory for an active suspension system or a robotic arm.

Figure 2:
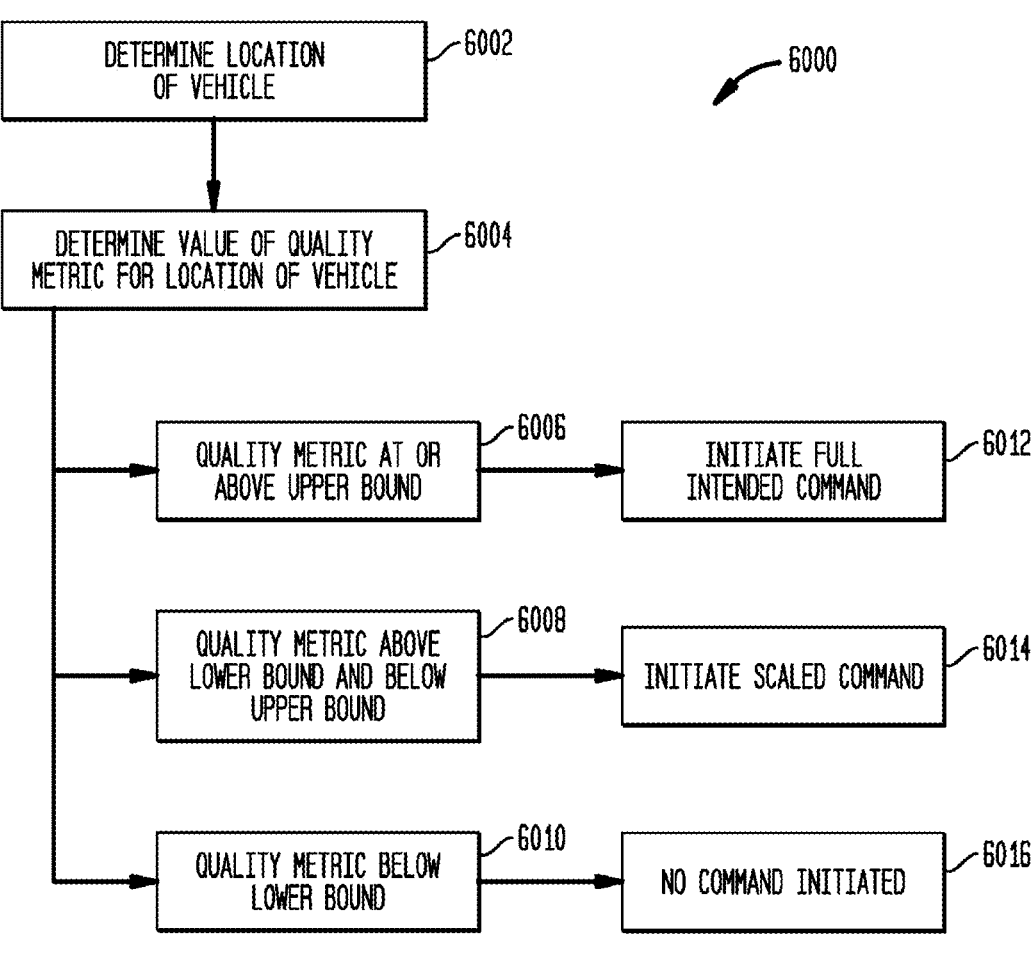
FIG. 2 illustrates a block diagram of a process for changing consumption based on a confidence level of location accuracy.

Referring to FIG. 2, a system 6000 performs a location recognition by determining (6002) a location of a vehicle. The system 6000 described herein defines a quality metric for the location recognition, for example, using a correlation value between the expected and actual output, or using a ratio of the number of events recognized over the total number of expected events, where an event might for example be a specific road signature such as a pothole, speedbump, etc., or a match with data expected from a subsection of road, or a recognition of an specific signature such as a sound or light from a transmitter, or a recognition of a specific feature in a camera feed, or many others. Using the performance metric, an upper bound and a lower bound for the quality metric may be defined.

The upper bound defines a level of the metric above which the path recognition is declared good, and the lower bound defines a level of the metric below which the path recognition is declared bad. The system 6000 determines (6004) a value for the quality metric. If the system determines that the value of the quality metric is at or below the lower bound (6010), the system may not continue to command the set of actuators (6016), since it may not have an accurate knowledge of its location and therefore cannot predict the correct future command to provide. If the system determines that the value of the quality metric is at or above the upper bound of the quality metric (6006), the system may apply its full intended command (6012) to achieve the desired performance. If the system determines that the value of the quality metric is between the upper and lower bounds (6008), the system may send a command that is a scaled version of the full input command (6014), scaled by a number that is mapped to the value of the path recognition metric. A mapping may be, for example, a linear scaling from 0-1, a lookup table relating the scale factor to the metric, a quadratic or nonlinear scaling, or any other direct relationship between one and the other.

This method may be applied to systems where the commanded input creates a monotonic improvement over a baseline state but may not be applied to a system where the primary function is not monotonic with the input. For example, it may not make sense to use path prediction to map the main steering command of an autonomous vehicle, because if the vehicle does not know its location, it could not simply "not steer" and still achieve even a baseline level of performance. However, the inventors have recognized that it may be advantageous to use a feedback system, such as a camera, LiDAR, and/or other sensors, to steer the vehicle, and a predicted path to correct the steering and allow the vehicle to improve on the smoothness of the trajectory, for example by starting turns wide, turning in until the apex of the turn, and then releasing back to the outside of the road.

In this scenario, no correction is applied if the location is not recognized, for example on the first drive in a given location, the vehicle would simply use its feedback sensors to provide acceptable, but likely subpar performance. When the location is recognized well, the vehicle receives a full correction command and reaches optimal performance; when a partial recognition is achieved, indicated by a value of the path recognition metric between the upper and lower bounds, then a partial correction command is applied, thus achieving performance that is better than the baseline if the location was correct, but worse than the optimal performance, but also achieving a performance that is still acceptable even if the location is only partially correct or the road has changed somewhat since the predicted path was created.

Air Suspension Control Using Proactive Control

Air suspension systems generally have a slow response time (typically up to 10 seconds to lift a vehicle) and therefore may need advance warning of a desired motion for the air suspension system to respond in time enough to be effective. The inventors have recognized that using crowd-sourced road maps along with terrain-based localization is an optimal way to provide this functionality on the time scale needed, as other vehicle-based sensors are unable to preview far enough ahead of the vehicle to allow enough time for the air suspension system to respond.

The inventors have recognized that crowd-sourced road surface information, including but not limited to road classification, road profiles, and/or road events may be used to modify the control strategies used for an air suspension system, especially a multi-chamber air suspension. In some implementations, using knowledge of large events (e.g., curbs, changes in incline, speed bumps, potholes, etc.) that may be ahead on the road, the multi-chamber air suspension may be used to stiffen or soften strategically to allow the vehicle to lift or lower as needed to traverse the events. In some implementations, using knowledge of the road character or type, for example a knowledge of the amount of primary ride content, an optimal setting for the air suspension system may be determined. In some implementations, using knowledge of the road type and/or road character, for example how much primary ride content there is, the optimal ride height may be determined and the vehicle may be pre-emptively raised or lowered. This type of control over the air suspension system may allow for more fuel-efficient operation as the vehicle may be operated as low as possible without compromise ride quality.

Using knowledge of specific road events that the particular vehicle has not yet traversed, but that have been experienced and mapped by other vehicles traversing the same road segment, optimal ride heights may be determined and set pre-emptively, allowing even a slow raising air suspension to provide benefits. Such optimal ride height determinations may be applied to, for example, driveway entrances, speedbumps, and/or large road events, as well as to the optimal height for loading docks for delivery fleet vehicles.

While geo-tagging of events (e.g., based on GPS data) may be performed for control of air suspension systems, recognizing and characterizing events may be necessary to provide for control beyond the scale of a few simple events like the owner's driveway.

Modifying the ride height based on general road characteristics also allows for generally lower ride heights, especially at higher driving speeds where aerodynamic effects of lowering ride height play an important role in fuel efficiency. Vehicles with air suspension may be configured to lower the vehicle at elevated speed, for example above 50 mph, but are generally unable to do so as aggressively as they would like due to the unknown character of the road that might lead to significantly lower comfort when reducing wheel travel too much.

Figure 3:
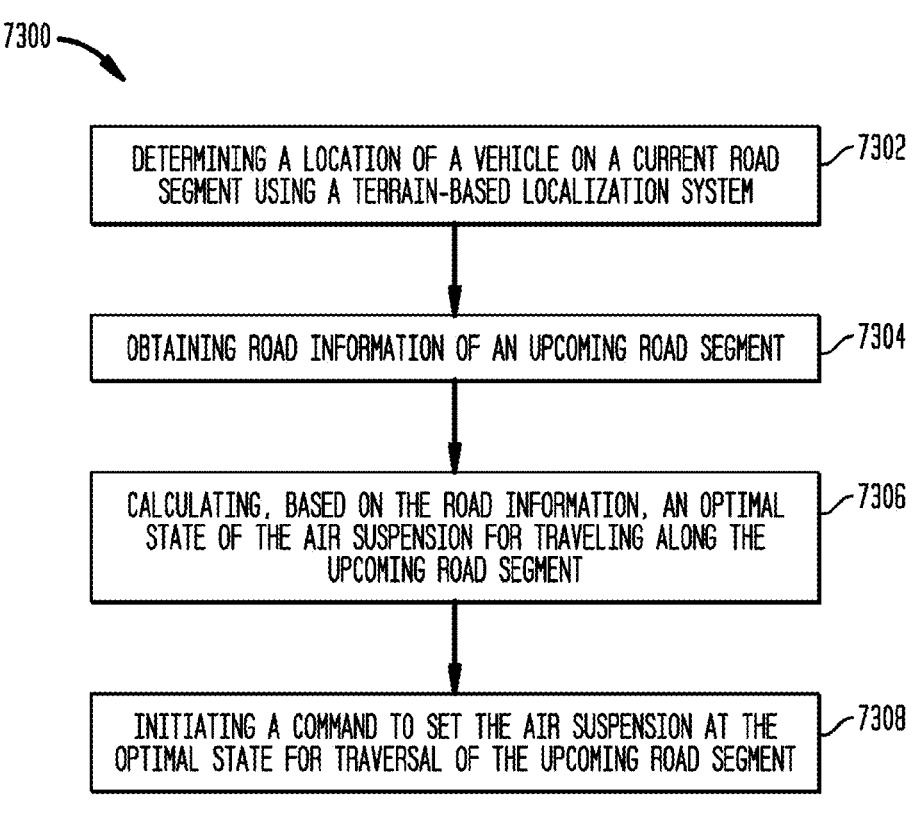
FIG. 3 is a flowchart of a process for proactively controlling an air suspension system of a vehicle.

Referring to FIG. 3, a process 7300 for controlling an air suspension system of a vehicle is shown. The process includes determining (7302) a location of the vehicle on a current road segment using a terrain-based localization system. The terrain-based localization system may include comparing a road profile of the current road segment with a set of candidate road segments (the set of candidate road profiles may be based on a general location of the vehicle determined via GPS) stored in a database. Based on the location that is determined, information about the current road segment and possible upcoming road segments may be obtained.

The process 7300 also includes obtaining (7304) road information including at least one of road characteristics, road events, or a road profile of an upcoming road segment. Road events, road characteristics, and/or road profiles may be crowd-sourced, characterized, and mapped, and stored in a cloud database. The cloud database may be continuously updated based on data received from vehicles traversing the road segments whose information is stored in the database.

The process 7300 also includes calculating (7306), based on the road information, an optimal state of the air suspension for traveling along the upcoming road segment, wherein the optimal state of the air suspension includes at least one of an optimal ride height or an optimal stiffness setting. The consumption algorithm for control of the air suspension system may account for the vehicle type (e.g., sports car, sedan, SUV, etc.) and characteristics (e.g., ground clearance, etc.), suspension type and characteristics, and the driving speed to properly act on the information. A height profile (i.e., the height setting changing over time) for the air suspension may be determined based on upcoming road events and adjustment times required by the air suspension to raise and/or lower the vehicle. The height profile may be determined based on upcoming road events, aerodynamics, and ride comfort. A stiffness profile (i.e., the stiffness setting changing over time) for the air suspension may be similarly determined. Height and/or stiffness profiles may also be determined based on a speed at which the air suspension system may be adjusted (i.e., the air suspension system may not be able to move fast enough to move from a first setting (an optimal state at time $t_1$) to a second setting (an optimal state at time $t_2$) within the time difference between $t_2$ and $t_1$.

The process 7300 also includes initiating (7308) a command to set the air suspension system at the optimal state for traversal of the upcoming road event. The command may be initiated in view of a required adjustment time for moving the air suspension system into the optimal state determined. Swerve Detection for Improved Event Consumption In consuming terrain-based data and implementing a command strategy for one or more vehicle systems based on such terrain-based data, missing a road surface event (e.g., a pothole, a speed bump, etc.) when the terrain-based data indicates that the vehicle should have experienced the event may lead to unexpected, and potentially uncomfortable, performance of the vehicle systems.

The inventors have recognized that a swerve detector for a terrain-based localization and control system may be designed to suppress event consumption when a vehicle is maneuvering in a way where the vehicle may not be likely to hit an event that would be expected to be hit on the road surface if not performing a swerving maneuver.

While driving, a terrain-based localization and control system is configured to serve the vehicle actuators (e.g., semi-active actuators, active suspension actuators, etc.) with information about upcoming events (e.g., potholes, speed bumps, etc.) so that the actuator control system may react in a way that improves experience of that event (e.g., occupant comfort, vehicle durability, vehicle performance, safety, etc.). Some event-specific control algorithms, if performed while on an ordinary flat road, may degrade ride comfort, for example, a pothole mitigation algorithm may stiffen a semi-active damper. If the vehicle operates using the pothole mitigation algorithm and hits the pothole, optimal performance may be achieved as the expected pothole was experienced. However, if the vehicle does not hit the event (e.g., the vehicle misses the pothole), ride comfort may be worse than if the control system performed no pothole mitigation.

The swerve detector may use an IMU and GPS to determine if a heading and/or path of the vehicle is deviating from the heading of previous vehicles driving on the road segment. While the deviation persists, a terrain-based localization system may suppress information about upcoming events so that event algorithms are not falsely triggered when the events are unlikely to be experienced by the vehicle. The swerve detector may look for large, unexpected lateral accelerations using an IMU (or another appropriate sensor) to determine if a swerve behavior is occurring.

Figure 4:
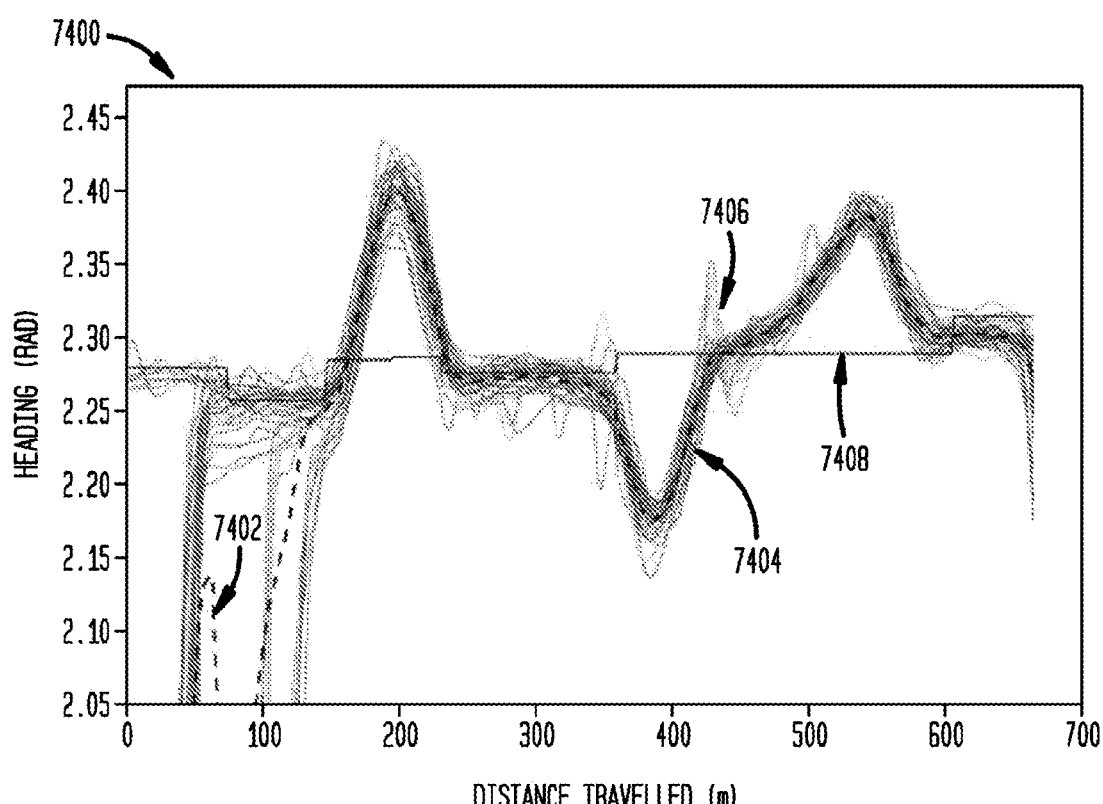
FIG. 4 is a graph showing an estimate of a vehicle heading from a plurality of traversals of a road segment.

Referring to FIG. 4, a graph 7400 shows an estimate of a vehicle heading from a plurality of traversals (e.g., traces 7404, 7406 track the vehicle heading) of a road segment. The dotted black line 7402 is an average of all traces. The majority of traces 7406 represent drives when the vehicle hit a pothole just after 400 m of distance had been traveled along the road segment. The outlier traces 7406 represent drives where the vehicle swerved to miss the pothole.

In some implementations, Aa swerve detector as described herein may use a live heading estimate to detect when the vehicle's heading (e.g., represented by one of the traces 7404, 7406) deviates from the average heading (i.e., dotted black line 7402). A solid black line 7408 is the heading of the road segment gathered from a map database that includes information on the road segment. Generally, this shows that map database geometry is not accurate or high-resolution enough to provide information to detect swerves. The swerve detector enables avoidance of false positives when consuming information about detected events. By not providing a "positive" when the vehicle swerves, we the accuracy rate for consumption may be improved.

Referring to FIG. 5, a flow chart 7450 depicts a method of determining a swerve behavior of a vehicle. The method includes obtaining (7452) historical heading data sourced from previous drives of a road segment; determining (7454) a current heading of a current vehicle traversing the road segment; comparing (7456) the current heading to the historical heading data; determining (7458) that a swerve behavior is occurring; and changing (7460) one or more operating parameters of the current vehicle based on the detected swerve behavior.

Using Terrain-Based Localization to Improve Travel Management Including End of Travel Controls The inventors have recognized that travel management improvement (proactive and reactive) may be used in vehicle systems for motion control given that those vehicle systems are influenced, directly or indirectly, by road inputs. Such vehicle systems may include, for example, vehicle systems that influence z-direction movement, including vehicle suspension systems (e.g., active suspension systems, semi-active suspension systems, air spring suspension systems, etc.), active roll control systems, and/or active seat suspension systems (e.g., active seat systems, etc.).

Travel management improvement is targeting proactively a desired motion through predictive information to feed into controls of the system. Two main controls approaches may be used. The first controls approach is to prevent engagement of travel limiting elements, such as, for example, end stops and/or secondary springs. The second controls approach is to, if travel limiting elements will engage or are chosen to be engaged, make the reaction more desirable than an uncontrolled engagement. For example, engagement of the travel limiting elements may be more smooth, more abrupt, etc., based on the situation.

Figure 6:
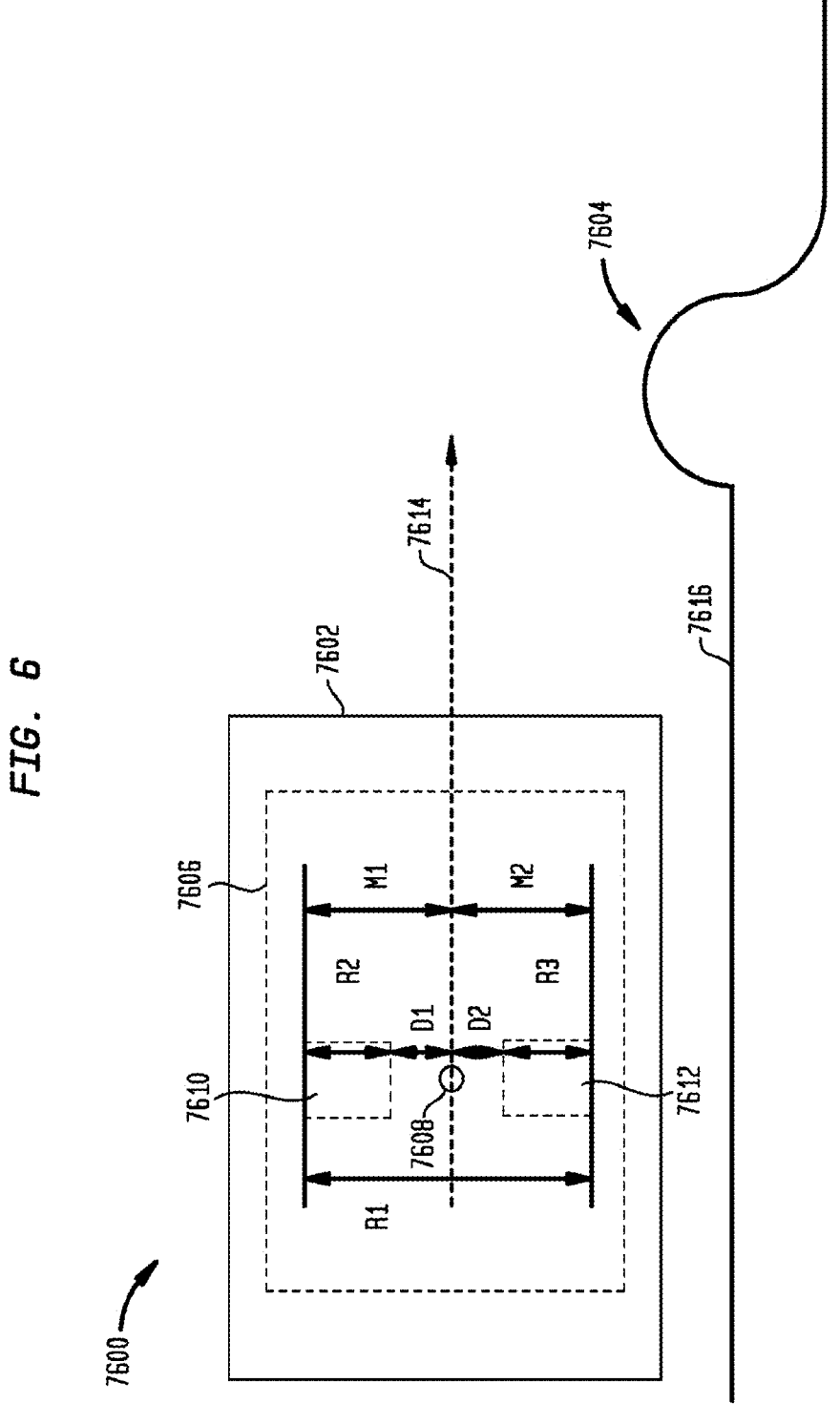
FIG. 6 shows a vehicle with a travel management system including a suspension actuator that is configured to be controlled based on information from a terrain-based localization system.

Referring to FIG. 6, in situation 7600, a vehicle 7602 is traveling on a road surface 7616 that includes a large road event 7604. The vehicle 7602 includes a suspension system 7606 that includes a suspension actuator 7608 and two passive suspension elements 7610 and 7612. The suspension actuator 7608 may be an active suspension actuator and the passive suspension elements may be end stops, secondary springs, and/or other travel limiting elements. The suspension actuator 7608 has a range of travel R1 (with a maximum upward travel M1 and a maximum downward travel M2) and the passive suspension elements 7610, 7612 have ranges of travel R2 and R3, respectively. The suspension actuator may move upward distance D1 and downward distance D2 prior to engaging the passive suspension elements 7610 or 7612, respectively. Note that FIG. 6 displays an event which is a higher height then the road. The same principle applies to a lower event. The road conditions may occur on one side of the vehicle (one wheel) or on both and may also be opposing (left to right, low and high).

From a resting current travel position 7614 (which may represent a ride height of the vehicle), the suspension actuator 7608 may be controlled to move within its range of travel R1. By using a predictive terrain-based localization system that utilizes upcoming road profile information, the actuator controller may initiate actuator control commands in view of upcoming road events (e.g., road event 7604). For example, in one implementation, as the vehicle 7602 approaches road event 7604, the actuator controller may initiate lowering the vehicle (e.g., moving actuator 7608 downward from current position 7614 into range D2) to allow actuator 7608 to have more travel space before impacting passive element 7610. In another implementation, the actuator controller may preemptively move actuator 7608 into range R2 so that the passive element 7610 is engaged prior to impacting the event. In another implementation, the actuator controller may move actuator 7608 upward into range D1 to allow for more downward travel to occur after the initial impact of hitting road event 7604. The actuator commands initiated by the actuator controller may be determined based on road information, vehicle information and optimized for comfort, fuel economy, vehicle durability, etc.

With the predictive information on the road (e.g., road surface information, road events, etc.) and the behavior of the device, it is possible to determine a health and functional state of the suspension system and initiate appropriate actions (e.g., for diagnostic purposes and/or adaptions). With the predictive information of the road, it is also possible to lower the vehicle to the ground more often and more precisely while preventing under floor damage to the vehicle (because the system proactively knows that there should not be a harmful event on the road surface that would damage the vehicle). This allows the vehicle to make gains in reducing fuel consumption and/or improving range (e.g., for electric vehicles) because of lowering the air resistance during driving. An improved travel management system is configured to automatically lower and raise the vehicle based on road information and therefore would spend more overall time positioned in a fuel-efficient state.

Additionally or alternatively, travel management improvement may also be used for applications such as, for example, systems which may benefit from a change in operating status due to road input and resulting vibration. For example, a CD player may stop playing or buffering for a period of time because a bumpy road section is ahead and CD reading may not work properly during traversal of the bumpy road section.

In some implementations, a position of a suspension device (e.g., a suspension actuator) may be proactively changed to allow for travel during an upcoming event so that the suspension device does not run out of travel during the event travel.

In some implementations, a control setting may be proactively changed to allow for a changed tuning set to prevent engaging an "out of travel" algorithm (e.g., a "higher damping control mode"). This controls change may also be done reactively, for example, when a road event already was hit, but in this situation, a strategy to counter the reaction is moving to a more desirable setting.

In some implementations, a controls setting may be proactively changed to allow for a changed tuning set to make the end of travel event more controlled, for example, to provide a more desirable experience for one or more occupants of the vehicle (e.g., increased comfort for rear seat passenger; even looking at left or right side in the rear of the vehicle) when the system knows that a response to an upcoming event will require more than the available travel of the suspension device.

In some implementations, travel management improvement may provide for a more efficient use of passive elements, damping elements or additional reaction force sources (e.g., extra spring), by using controls. In some implementations, a suspension system may be modified to remove some passive elements because the control system is now able to mimic behavior of the passive elements without them being present in the system. For example, the control system may be faster (i.e., does not need to wait for the system to react).

Referring to FIG. 7, a flow chart 7650 depicts a method of controlling travel of an actuator of a suspension system of a vehicle. The method includes obtaining (7652), from a terrain-based localization system, road information for a road segment on which the vehicle is traveling; obtaining (7654) passive suspension element parameters of the suspension system; determining (7656), a position of an actuator of the suspension system; determining (7658), based on the road information, the passive suspension element parameters, and the position of the actuator, optimal positions for the actuator for traversing the road segment; and initiating (7660), by an actuator controller, one or more actuator commands to position the actuator at the optimal positions as the vehicle traverses the road segment.

Road Profile Creation Techniques

Generally, road profile data acquired at different speeds and with different sensor sets cannot be easily blended, and cannot be easily compared to a new dataset. This shortcoming makes creation of and updating of a road profile database difficult when drives along road segments are not often performed at the exact same speed using the exact same sensor set as vehicles differ widely.

The inventors have recognized that blended road profiles may be created from sensor data in a set of vehicles by combining multiple data acquisitions from different vehicles, different sensor sets, and/or different driving speeds. The inventors have recognized that by accounting for the range of high fidelity for each dataset, blending them in the spatial frequency domain is possible and advantageous.

Referring to FIG. 8, a method 7500 of blending multiple datasets into a single road profile estimate is shown. The method includes obtaining (7502) multiple datasets that represent road profile estimations of a road segment. The multiple datasets may be gathered by different vehicles, the same vehicle operating at different speeds, and/or by different sensors sets. Each sensor set used may have certain characteristics that may reduce the validity of the estimated road profile of the road segment traversed by the vehicle. For example, a road scanning laser sensor may provide an accurate road profile with relatively low spatial resolution, and with typically no low-frequency accuracy due to its inability to measure absolute movement. A system including a road-scanning laser and an inertial measurement of the motion of the base of the road scanner (for example, the vehicle body it is mounted to) may provide better low frequency tracking. The addition of a GPS unit may provide better reference measurements for very low frequency. As another example, a single wheel accelerometer may provide a good estimate of road content on one side of the vehicle between about 1 Hz and about 10 Hz in a typical vehicle, because the wheel will generally follow the road for normal driving, and below the natural frequency of the unsprung mass on the tire ("tire hop"), which is typically around 12 to 15 Hz. The addition of a suspension position sensor and a body accelerometer or body-mounted IMU may extend the validity of the estimate to below 0.5 Hz. Any appropriate body-mounted sensor which senses movement of the rigid vehicle body may be used in addition to or instead of the body accelerometer or body-mounted IMU. Adding a force sensor in the wheel hub may extend the validity of the road estimate to above 12 Hz. At a given driving speed, each temporal frequency range translates into a spatial frequency rate. This means that even given a specific sensor set, for example with good fidelity between 1 Hz and 10 Hz, the resulting spatial mapping of the road content may only be valid at spatial frequencies corresponding to the frequency divided by the vehicle's driving speed, for example at 1 m/s and with 1 Hz to 10 Hz valid range, the spatial frequency of high fidelity data would correspond to 1 m to ¹⁄₁₀ m wave lengths, while at 5 m/s driving speed the same sensor set would provide high fidelity data between 5 m and ½ m wave length.

High frequency data acquisition may provide a point every ¹⁄₁₀₀ of a second, for example, or ¹⁄₁₀₀₀ of a second, while low frequency data acquisition might provide a data point every 1 second or every ¹⁄₁₀ second. This may lead to a spatial resolution of data available that may vary, depending on the driving speed, even for the same sensor set and data acquisition, but is especially variable between different data acquisition sets.

The present disclosure provides a method for combining these disparate measurements into a single measurement to efficiently create good road profiles and/or create better estimates of true road profiles using multiple vehicle sensor sets and multiple data acquisition sets. The present disclosure also allows for the acquisition of data at multiple driving speeds. This method also allows acquisition of more precise data with even just a single sensor set by simply driving the same road at different speeds.

The data acquired by each run, with a given sensor set and driving speed, is determined (7504) to be valid in only a spatial frequency range consistent with the ratio of the declared validity range of the sensor set (in l/s or Hz) and the driving speed (in m/s). Based on the valid spatial frequency ranges, the multiple datasets may be blended (7506) into a single road profile estimate in the spatial frequency domain. A sharp filter, for example a brick-wall filter (also may be called a knife-edge filter), is applied in an acausal way to the data set to remove spatial frequency content outside of the valid range without introducing any phase delays, and the data thus acquired is interpolated at the spatial frequency values predefined for the road profile (for example a linear spacing of points between 0.01 [l/m] and 100 [l/m], or a logarithmic spacing of points between those spatial frequencies). The data is then averaged into the existing data for this road segment through known averaging methods, for example by adding the frequency content and dividing by the number of points at that frequency value. A single road profile estimate may be stored (7508) in a database, e.g., a cloud database including road profile estimates of many different road segments.

Resolving the data to spatial frequency for each road segment also allows blending of different data acquisition rates, while accounting for the fact that data acquired at lower rates will have a maximum valid frequency that is impacted by this low rate. For example, at a data rate of 1 point per second, and a driving speed of 5 m/s, data may only be acquired at a rate of 1 data point every 5 m, and thus may only resolve spatial waves greater than 10 m, corresponding with a spatial frequency of ¹⁄₁₀ [l/m]. Taking this into account allows proper blending of different datasets into one cohesive set of data.

When comparing newly acquired data to an existing road profile, for example to calculate terrain-based localization, a similar process may be used. The road data used for the comparison is generally valid for a given spatial frequency range, depending on the data used to compose the road data. This range may be expressed, for example, as the spatial frequency points at which at least 3 data points exist, or a similar metric. The spatial frequency range of validity for the new dataset may be determined as described above. When comparing the new dataset to the road data, a comparison may be done in the frequency range where both overlap. For example, if the previous road data is valid from 0.1 [l/m] to 10 [l/m] and the new data is valid from 1 [l/m] to 5 [l/m], then a comparison may be done in the range from 1 [l/m] to 5 [l/m]. If instead the new data is valid between 3 [l/m] and 20 [l/m], then the comparison may only be done in the frequencies that overlap, or between 3 [l/m] and 10

[l/m]. This method may be done by decomposing each data set into spatial frequency, acausally filtering the data sets, and then comparing them either in the spatial frequency domain or in the time domain.

In some implementations, many alternative sensor sets may be used. Vehicle-based inertial sensors (accelerometers and/or rate sensors) may be used in combination or separate from GPS units, distance measurement units such as lasers, lidars, and radar systems, as well as ground-penetrating radar.

In some implementations, the system may be deployed on a specific vehicle designated for measurement, or the system may be deployed on a multitude of vehicles that all acquire different sets of data. Data acquisition may be local and/or stored in the cloud.

In some implementations, data transfer may occur continuously or at the end of an acquisition, or at intervals along the road. Data may be transferred using Wi-Fi, physical media (storage disks), Bluetooth, and/or any other data transfer medium.

Vehicle sensor sets may be common throughout a fleet of vehicles, or may be different for different vehicles, with some acquiring higher resolution data and some lower, and some acquiring data that is valid in different frequency ranges than others. This allows a multitude of vehicles to be used and in many cases does not require specific sensors to be installed in vehicles that already have motion sensors dedicated to other vehicle systems, such as, for example, suspension systems, lighting systems, etc.

Localization Enhancement Using Terrain-Based and Sensor-Based Methods

Each type of vehicle-based sensor has strengths and weaknesses in terms of accuracy, reliability, and validity. Examples of enhanced localization that may be achieved include, but are not limited to, maintaining localization in tunnels or other scenarios with poor GPS performance, enhancing localization above GPS precision where both terrain-based localization and GPS are available, inserting vision-based localization to allow quick reference for absolute landmarks, improving accuracy of vision-based landmarks through more accurate reference location, etc.

GPS generally has limited accuracy (typically a 5 m radius) and availability (e.g., due to tunnels, nearby buildings, cloud cover, and/or trees). Terrain-based localization may have limited availability until a road has been mapped but is highly accurate. Vision-based localization may have limited availability (until mapped) and limited usability (e.g., due to lighting, rain, snow, etc.).

The inventors have recognized that localization may be enhanced by creating a sensor fusion of terrain-based localization, GPS, and vision systems. Many different kinds of sensors may be used, including but not limited to, vision sensors, infrared sensors, short-wave infrared sensors, lidar, radar, ground-penetrating radar, GPS, motion sensors in the plane of the road surface, motion sensors out of the plane of the surface, and sensors on the wheels or the vehicle body. Navigation in highway tunnels may be heavily affected by loss of GPS signal and proper navigation may be critical for future vehicles. Accurate localization is important for event recognition and may be increasingly important for autonomous vehicles. The systems and methods described herein for enhanced localization may apply to many different types of vehicles and are not intended to be limited to road passenger vehicles.

Sensor fusion of the three systems (GPS, terrain-based localization, and vision-based localization) may provide a system that is, despite time, location, or conditions, equal to or better than the individual component systems with much higher availability. Each independent component has metrics for when it is reliable and when it is not reliable, and the sensor fusion may thus be parametrized to use only reliable inputs. The resulting output may provide a reliability metric and an accuracy metric based on the current sensors being used.

When using sensors to locate a vehicle in space, multiple methods may be used. Global positioning systems (GPS) may precisely locate a GPS receiver based on triangulation from four or more satellites. This method affords very good absolute accuracy (in the range of about 5 m) when available and is the primary sensor used in many applications.

Differential GPS systems use multiple GPS receivers to create an even more accurate location. Vision-based sensors (such as cameras, infrared sensors, etc.) may identify previously mapped objects and thus locate the vehicle with respect to those coordinates. Distance-based measurements (such as lidar, radar, etc.) may locate the vehicle relative to other surfaces and may be able to identify recognizable patterns to create an absolute reference (such as ground-penetrating radar, for example). Response-based methods (such as terrain-based localization) are able to recognize tracts of road and locate the vehicle very precisely (e.g., less than 1 m accuracy, less than 10 cm accuracy, etc.) when available. Motion-based localization (dead reckoning, for example based on vehicle speed, yaw rate, and in-plane accelerations) is extremely accurate for relative motion but is unable to provide an absolute reference.

Figure 9:
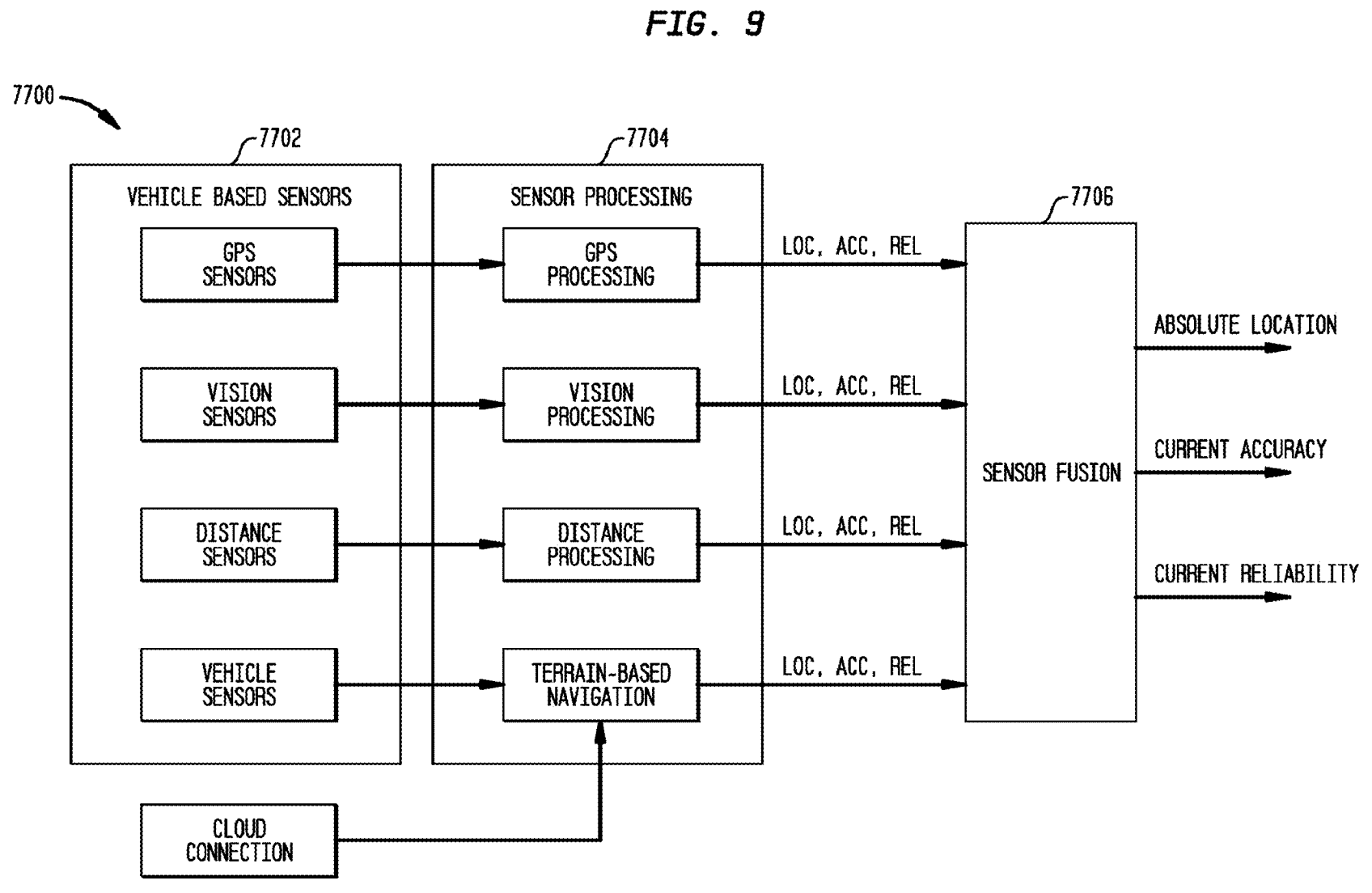

Referring to the block diagram 7700 of FIG. 9, each of the vehicle-based sensors 7702 described herein has strengths and weaknesses in terms of their range, accuracy, and resolution (in terms of data rate in time or distance). But each of the sensors may also have spotty availability based on environmental conditions, signal shielding, availability of previously generated maps, and other factors. A sensor fusion for each of these may therefore combine multiple factors. The sensor fusion may generate an absolute location (in some instances, with an associated accuracy estimate and a reliability value of the signal) based on varying sensor content without causing jumps in the output signal. To achieve this absolute location, each sensor is first processed (see sensor processing block 7704 in FIG. 9) to provide its own estimate of location, along with an instantaneous accuracy (based for example on the number of satellites available in a GPS sensor, or on the vehicle speed in a motion sensor) and an instantaneous reliability (to determine if this signal should be used at that moment).

A sensor fusion block 7706 may then combine the sensors. In some implementations, it may be preferable to use the accurate relative sensors such as motion sensors (yaw rate, in-plane accelerations, and vehicle speed sensors) for high frequency deviations, and absolute sensors as corrections (such as GPS). In the systems and methods described herein, sporadic but more accurate absolute sensors, such as terrain-based localization and object recognition-based localization, may be included in the sensor fusion.

This inclusion may require blending the GPS signal with a more accurate signal at lower frequency. This may be done using a Kalman filter, for example, with a vehicle model whose states are updated when new information is received. A Kalman filter uses a model to predict the motion of the vehicle based on certain sensor inputs (for example the in-plane motion sensors and the vehicle speed). Next, the model output is compared to actual measurements of the absolute position when such actual measurements are available and reliable (for example, at intervals when GPS signal is output or when an object is recognized by the camera). The error thus obtained may then be used to modify the states of the model, and to correct for drifts, sensor offsets, and other such errors as they occur. For example, a lateral accelerometer may be accurate in tracking the lateral motions of the vehicle but may be skewed by rolling of the vehicle (where the sensor is not parallel to the surface anymore). As another example, the speed reading in a typical vehicle relies on knowing the effective rolling radius of the tires, which changes over time, with temperature, use of the tire, and inflation pressure, but also changes when the tires are changed on the vehicle. These factors may be combined to create a tracking model that allows for accurate positioning over long distances with a mix of sensors that may vary in time and also from vehicle to vehicle.

Referring to FIG. 10, a flow chart 7750 depicts a method of localizing a vehicle traversing a road segment. The method includes determining (7752) a first vehicle circumstance at a first time; choosing (7754) a first localization method to employ based on the first vehicle circumstance, localizing (7756) the vehicle using the first localization method; determining (7758) a second vehicle circumstance at a second time; choosing (7760) a second localization method to employ based on the second vehicle circumstance; and localizing (7762) the vehicle using the second localization method.

In some implementations, the first localization method and the second localization method are selected from the group consisting of GNSS localization, terrain-based localization, vision-based localization, distance-based localization, and dead reckoning.

In some implementations, the vehicle circumstance and the second vehicle circumstance are selected from the group consisting of weather conditions, overhead obstructions, cellular data availability, and GNSS satellite availability.

Figure 11:
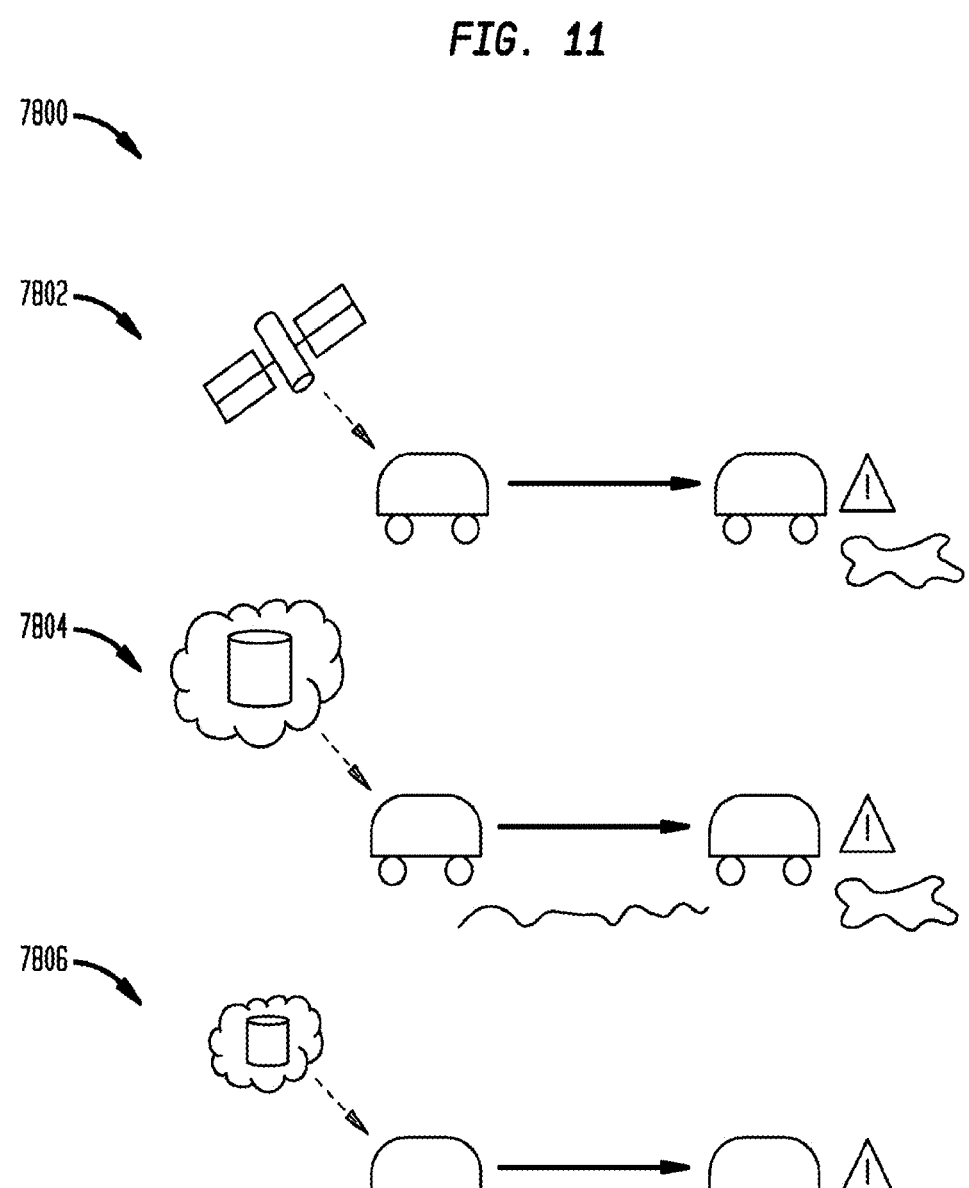
FIG. 11 shows a vehicle using different methods for localization based on vehicle circumstances.

Longitudinal Vehicle Localization by Switching Between GNSS, Dead-Reckoning, and Terrain-Based Methods Determining vehicle longitudinal position has various use-cases, such as preparing an active suspension for upcoming road conditions and/or helping an autonomous vehicle navigate. As shown in FIG. 11, a vehicle system may measure its longitudinal position in various ways, each of which has benefits and drawbacks. A first method 7802 depicts using GNSS systems such as GPS, which has an advantage of high availability, but is generally only accurate to 5 meters and does not work in tunnels due to overhead obstruction. In such a method, the vehicle receives signals from GNSS satellites to determine latitude and longitude to allow the vehicle to prepare for road conditions that have known coordinates. A second method 7804 depicts using terrain-based localization (i.e., road profile cross-correlation) works on almost any road, even in tunnels and has very high accuracy (10 cm), but requires a lot of cellular traffic to download reference profiles. In such a method, the vehicle downloads reference road profiles form a database, drives and matches one of the reference road profiles, and may prepare for road conditions that have known positions in the reference road profile. A third method 7806 depicts using dead reckoning after event detection, but this method generally only works on roads which have major impact events but has the advantage that it may work well in tunnels, has generally high accuracy (10 cm, but error accumulates with dead reckoning), and requires low cellular network usage.

The inventors have recognized that a vehicle may utilize all three of these methods to localize longitudinally, switching between them depending on current conditions. For example, if cell tower reception is good, a vehicle may download reference profiles to perform terrain-based localization. Otherwise, the vehicle may fall back to localizing with GNSS or event detection.

Referring to FIG. 11, a vehicle may determine its position with respect to a road condition in various fashions. When cellular data is readily available, the vehicle may choose terrain-based localization method 7804 and download a reference profile and perform terrain-based localization. If cell reception is sparse but a road contains several impact events, the vehicle may choose to use method 7806 and dead reckon between events. In another scenario, the vehicle may use method 7802 to use GNSS systems to localize.

Terrain-based localization generally has very high accuracy, but it may be impractical to download all reference profiles in a large geographic region. Furthermore, cellular reception may vary significantly as the vehicle traverses different roads. To provide maximum availability of longitudinal localization, implementing multiple strategies, and switching between them to employ the strategy that works best under current vehicle circumstances is advantageous.

The above-described embodiments of the technology described herein may be implemented in any of numerous ways. For example, the embodiments may be implemented using hardware, software or a combination thereof. When implemented in software, the software code may be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format. It should also be understood that any reference to a controller in the current disclosure may be understood to reference the use of one or more processors configured to implement the one or more methods disclosed herein.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices may be used, among other things, to present a user interface. Examples of output devices that may be used to provide a user interface include display screens for visual presentation of output and speakers or other sound generating devices for audible presentation of output. Examples of input devices that may be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. These methods may be embodied as processor executable instructions stored on associated non-transitory computer readable media that when executed by the one or more processors perform any of the methods disclosed herein. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computing devices or other processors to implement various aspects of the present disclosure as discussed above. As used herein, the term "computer-readable storage medium" encompasses only a non-transitory computer-readable medium that may be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that may be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method of creating a road profile estimate, the method comprising:

obtaining multiple datasets, each of the multiple datasets representing a road profile estimation for a road segment, the multiple datasets originating from either different vehicles, different sensor sets, or operation at different speeds, wherein the multiple datasets include data recorded at different spatial and/or temporal frequencies;

determining a range of spatial frequencies where each of the multiple datasets have high fidelity;

blending the multiple datasets into a single road profile estimate in a spatial frequency domain; and storing the single road profile estimate in a database.

2. The method of claim 1, further comprising translating, based on a driving speed, a temporal frequency range of each of the multiple datasets into a spatial frequency range.

3. The method of claim 1, wherein the blending of the multiple datasets is based on a valid spatial frequency range of each of the multiple datasets.

4. The method of claim 1, wherein blending further comprises applying a sharp filter in an acausal way to each of the multiple datasets.

5. The method of claim 4, wherein the sharp filter is a brick-wall filter or a knife-edge filter.

6. The method of claim 4, wherein the sharp filter removes spatial frequency content outside of a valid range for each of the multiple datasets.

7. The method of claim 6, wherein the sharp filter maintains a phase of each of the multiple datasets.

8. The method of claim 6, wherein the sharp filter removes spatial frequency content outside of the valid range without introducing any phase delays.

9. The method of claim 6, wherein the valid range is a valid range of spatial frequencies for each of the multiple datasets, wherein the valid range is based on a frequency response of the sensor sets divided by a vehicle driving speed.

10. The method of claim 4, further comprising interpolating data for each of the multiple datasets based on spatial frequency values of the single road profile estimate.

11. The method of claim 4, further comprising averaging data for each of the multiple datasets into the single road profile estimate.

\* \* \* \* \*